(12) United States Patent
Sakakibara

(10) Patent No.: US 7,993,772 B2
(45) Date of Patent: Aug. 9, 2011

(54) BATTERY PACKS SUITABLE FOR USE WITH BATTERY POWERED APPLIANCES

(75) Inventor: Kazuyuki Sakakibara, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

(21) Appl. No.: 12/862,349

(22) Filed: Aug. 24, 2010

(65) Prior Publication Data

US 2010/0316900 A1 Dec. 16, 2010

Related U.S. Application Data

(63) Continuation of application No. 12/498,736, filed on Jul. 7, 2009, now Pat. No. 7,879,483, which is a continuation of application No. 11/733,644, filed on Apr. 10, 2007, now Pat. No. 7,572,547, which is a continuation of application No. 10/281,742, filed on Oct. 28, 2002, now Pat. No. 7,238,443.

(60) Provisional application No. 60/332,985, filed on Nov. 5, 2001.

(30) Foreign Application Priority Data

Nov. 1, 2001 (JP) ................................. 2001-337045

(51) Int. Cl.
*H01M 10/50* (2006.01)
(52) U.S. Cl. ............. 429/120; 429/72; 429/99; 429/148
(58) Field of Classification Search .................. 429/120, 429/148, 72
See application file for complete search history.

(56) References Cited

U.S. PATENT DOCUMENTS

| 5,589,290 | A | 12/1996 | Klink et al. |
| 5,593,794 | A | 1/1997 | Wei |
| 5,909,101 | A | 6/1999 | Matsumoto et al. |
| 5,912,546 | A | 6/1999 | Sakou et al. |

(Continued)

FOREIGN PATENT DOCUMENTS

DE 32224161 6/1982

(Continued)

OTHER PUBLICATIONS

Partial EP Search Report, Feb. 21, 2005.

(Continued)

*Primary Examiner* — John S Maples
(74) *Attorney, Agent, or Firm* — Dickstein Shapiro LLP

(57) ABSTRACT

Cooling air intake port (52), cooling air exhaust port (55), and securing walls (86, 87), which contact and secure the side surfaces of one or more battery cells (72), may be defined within two battery pack housing halves (50, 80). When battery pack (99) is assembled, at least one cooling air passage (91, 92) is defined by the side surfaces of the battery cells, the interior surface of the battery pack housing, and the securing walls. The cooling air passage connects the cooling air intake port to the cooling air exhaust port. Further, the securing walls isolate or physically separate the cooling air passage from battery terminals (72a, 72b). By forcing cooling air through the cooling air passage, the battery cells can be effectively and efficiently cooled. In addition, if the battery terminals are isolated from the cooling air by the securing walls, the electrical contact areas of the battery cells are protected or shielded against outside moisture and foreign substances that may be introduced into the battery pack by the cooling air.

17 Claims, 15 Drawing Sheets

U.S. PATENT DOCUMENTS

| | | |
|---|---|---|
| 6,066,938 A | 5/2000 | Hyodo et al. |
| 6,075,347 A | 6/2000 | Sakakibara |
| 6,087,038 A | 7/2000 | Flament et al. |
| 6,124,698 A | 9/2000 | Sakakibara |
| 6,191,554 B1 | 2/2001 | Nakane et al. |
| 6,191,560 B1 | 2/2001 | Sakakibara |
| 6,204,640 B1 | 3/2001 | Sakakibara |
| 6,204,641 B1 | 3/2001 | Sakakibara |
| 6,211,645 B1 | 4/2001 | Kouzu et al. |
| 6,225,786 B1 | 5/2001 | Maramatsu et al. |
| 6,229,280 B1 | 5/2001 | Sakoh et al. |
| 6,275,009 B1 | 8/2001 | Sakakibara et al. |
| 6,278,261 B1 | 8/2001 | Sakakibara |
| 6,362,600 B2 | 3/2002 | Sakakibara |
| 6,373,228 B1 | 4/2002 | Sakakibara |
| 6,404,167 B1 | 6/2002 | Sakakibara |
| 6,433,515 B2 | 8/2002 | Sakakibara |
| 6,433,517 B2 | 8/2002 | Sakakibara |
| 6,498,406 B1 | 12/2002 | Horiuchi et al. |
| 6,566,005 B1 | 5/2003 | Shimma et al. |
| 6,783,886 B1 | 8/2004 | Sakakibara |
| 7,238,443 B2 | 7/2007 | Sakakibara |
| 7,572,547 B2 | 8/2009 | Sakakibara |
| 7,736,792 B2 * | 6/2010 | Moores et al. ......... 429/71 |
| 2001/0017531 A1 | 8/2001 | Sakakibara et al. |
| 2001/0048289 A1 | 12/2001 | Sakakibara |
| 2002/0079867 A1 | 6/2002 | Sakakibara et al. |

FOREIGN PATENT DOCUMENTS

| | | |
|---|---|---|
| DE | 10003247 | 1/2000 |
| DE | 10055158 | 11/2000 |
| EP | 0 813 265 A2 | 12/1997 |
| EP | 0 940 864 | 9/1999 |
| EP | 0 994 523 | 4/2000 |
| EP | 1 026 770 A1 | 8/2000 |
| EP | 0 975 031 A1 | 1/2001 |
| EP | 1 109 237 A1 | 6/2001 |
| JP | 8-298103 A | 11/1996 |
| JP | 2001-203004 A | 7/2001 |
| WO | WO98/31059 | 7/1998 |
| WO | WO 99/28736 | 6/1999 |

OTHER PUBLICATIONS

European Search Report, Dec. 28, 2004.
JP 2001-337045; Japanese Office Action mailed Jun. 14, 2005 with Japanese (4 pages) and English (4 pages) translation thereof.
European Search Report, Jun. 15, 2007.
U.S. Appl. No. 12/498,736 Notice of Allowance Jun. 2010.
EP Search Report for EP10169510.4 dated Sep. 16, 2010.
EP Search Report, for EP10169517.9 dated Sep. 16, 2010.
EP Search Report for EP10169529.4 dated Sep. 16, 2010.
EP Search Report for EP10169534.4 dated Sep. 16, 2010.

* cited by examiner

BATTERY PACKS SUITABLE FOR USE WITH BATTERY POWERED APPLIANCES

CROSS-REFERENCE

This application is a continuation of U.S. patent application Ser. No. 12/498,736 filed on Jul. 7, 2009, now U.S. Pat. No. 7,879,483, which is a continuation of U.S. patent application Ser. No. 11/733,644 filed on Apr. 10, 2007, now U.S. Pat. No. 7,572,547, which is a continuation of patent application Ser. No. 10/281,742, filed Oct. 28, 2002, now U.S. Pat. No. 7,238,443 issued Jul. 3, 2007, which claims the benefit of U.S. provisional application Ser. No. 60/332,985, filed Nov. 5, 2001.

This application also claims priority based on Japanese patent application serial number 2001-337045, filed Nov. 1, 2001, the entire contents of which are hereby incorporated by reference.

BACKGROUND OF THE INVENTION

1. Technical Field

The present invention relates to rechargeable battery packs having one or more battery cells disposed within a case or housing. This battery pack may be electrically coupled to a battery charger in order to charge the battery cells. Thereafter, the charged battery pack may be connected to a power tool or another battery-powered appliance in order to supply current to the tool or device.

2. Description of the Related Art

Generally speaking, known rechargeable battery packs are installed in a battery charger in order to re-charge the batteries. A plurality of individual batteries or battery cells may be connected in parallel and/or in series in order to provide the desired battery voltage and output current. During recharging, the battery cells typically generate heat, thereby increasing the temperature of the battery cells. Various arrangements for cooling the battery cells during the recharging operation have been proposed.

Nickel metal hydride batteries provide increased or greater battery capacity (energy density) as compared to other known battery technologies, such as nickel-cadmium batteries, thereby making nickel metal hydride batteries particularly suitable for driving power tools. In addition, nickel metal hydride batteries do not include cadmium, thereby providing a more environmentally friendly power storage device. However, thus far, the use of nickel metal hydride batteries has been limited in the power tool field, because nickel metal hydride batteries are known for generating a relatively large amount of heat when known charging techniques are utilized to re-charge the batteries, especially if a relatively quick charge is performed. If the temperature of the nickel metal hydride battery cells is allowed to become higher than a certain threshold temperature (typically, between about 50°-60° C. for current nickel metal hydride battery technologies), the life of the battery cell may be significantly shortened due to internal damage caused by the relatively high temperature. The nickel metal hydride batteries, of course, also could be charged relatively slowly in order to minimize the likelihood of excessive temperature increases. However, slow charging will naturally reduce the desirability of utilizing nickel metal hydride batteries, because the power tool operator must wait a comparatively longer time to recharge the battery pack for further use.

Thus, there is a long-felt need in the power tool field, as well as other fields that utilize rechargeable batteries, to develop battery pack designs and battery charging technologies that will enable nickel metal hydride batteries, or other battery types that become hot during recharging, to be quickly charged without overheating and thus damaging the battery cells.

Furthermore, battery-driven power tools generally must be operated using relatively large currents in order to operate with the same efficiency and effectiveness as power tools driven by a commercial AC power source. Thus, if a short circuit develops within the battery pack, serious problems could result due to the relatively high currents that can be supplied by nickel metal hydride batteries. Therefore, the battery cells are preferably isolated or shielded from outside moisture and foreign substances in order to prevent or reduce the possibility of short circuits within the battery pack. Moreover, it is preferable to uniformly cool the battery cells during the recharging operation so that all the battery cells are maintained at substantially the same temperature. In this case, it is possible to avoid the possibility that one or more battery cells will reach a temperature that will cause permanent damage to the battery cell, and thereby make the battery pack inoperative for its intended purpose.

European Patent Publication No. 0 940 864 describes a battery pack structure for nickel metal hydride battery cells. However, this known design focuses primarily on cooling the battery cells and does not teach any techniques for protecting the battery cells from moisture and foreign substances. In fact, the battery cells of European Patent Publication No. 0 940 864 are cooled by directly contacting the battery cells with forced air supplied from the battery charger and/or the power tool. Thus, moisture or foreign substances can easily contact the battery terminals and cause degradation, which may lead to short circuits. Further, the battery packs of European Patent Publication No. 0 940 864 rely upon metal heat sinks in order to uniformly cool the battery cells within the battery pack. However, a metal heat sink will naturally increase the overall weight of the battery pack, as well as the cost of manufacturing the battery packs.

In European Patent Publication No. 0 994 523, the present Applicant proposed a battery pack design in which a plurality of battery cells is disposed within a dual-wall housing. An inner case optionally may be formed, either entirely or partially, from a thermally conductive material, such as aluminum. Further, the inner case may directly contact the battery cells in order to uniformly cool the battery cells. In addition, the inner case may substantially surround or enclose the battery cells in order to protect the battery cells from outside moisture and foreign substances. Moreover, the inner case may be housed or disposed within an outer case and a cooling-air passage may be defined between the inner and outer cases. Thus, the battery pack design of European Patent Publication No. 0 994 523 enables uniform cooling of the battery cells while preventing moisture and foreign substances from contacting the battery terminals. Further, the double housing serves to protect the power tool operator in the event that a short circuit happens to develop between the battery cells.

Thus, European Patent Publication No. 0 994 523 provides a commercially useful battery pack design, which effectively cools nickel metal hydride batteries during the recharging operation and effectively prevents degradation that could lead to dangerous short circuits.

SUMMARY OF THE INVENTION

Although European Patent Publication No. 0 994 523 provides several advantages over the known art, it is one object of the present teachings to provide further improvements in battery pack designs. For example, in one aspect of the present teachings, the metal heat sink can be removed or eliminated without sacrificing cooling efficiency. Thus, lower weight and less expensive battery packs can be made using the present teachings. Such battery pack designs are particularly useful with nickel metal hydride batteries, although the present battery pack designs, of course, can be utilized with any type of rechargeable battery and more preferably, with rechargeable batteries that generate heat during recharging and/or during use (discharging).

In another aspect of the present teachings, battery pack designs are taught that are particularly useful with battery cells, such as nickel metal hydride batteries, that require strict temperature control during charging and isolation from external moisture and foreign substances in order to prevent short circuits and degradation of the battery cells.

In one embodiment of the present teachings, a plurality of elongated battery cells (e.g., nickel metal hydride battery cells) may be positioned in a side-by-side relationship such that the respective end faces (i.e., the battery terminals) are positioned within the same plane, or substantially the same plane. In this embodiment, the end faces or terminals of the respective battery cells are preferably isolated from a cooling air passage in order to prevent degradation of the battery terminals, as well as the contacts (conductive material) that extend between the battery terminals. The battery packs also may generally include a cooling air intake port, a cooling air exhaust port, and supports or securing walls for receiving and securing the battery cells within the battery pack. The cooling air passage preferably extends within the battery pack between the cooling air intake port and the cooling air exhaust port. Further, the cooling air passage may be partially defined by the side surfaces of the respective battery cells and the interior surface of the battery pack housing. The supports may be utilized to isolate the cooling air passage from the end faces or terminals of the battery cells.

In such an embodiment, the cooling air may be effectively and efficiently utilized to cool the battery cells, because the cooling air will directly contact the respective side surfaces of the battery cells. However, because the end faces or terminals of the battery cells are isolated or physically separated from the cooling air passage, the electrical contacts extending between the battery cells group are effectively protected from outside moisture and foreign substances. Thus, degradation of the battery contacts can be minimized while still effectively cooling the battery cells during a charging operation.

In another embodiment of the present teachings, a plurality of elongated battery cells may be disposed in a side-by-side relationship such that the side surfaces of the battery cells are disposed closely together (e.g., adjacent to each other). Optionally, the respective side surfaces may contact each other. In these embodiments, the supports (or securing walls) may secure the battery cells by contacting and supporting the outermost peripheral surface of the battery cells. The supports may be defined or disposed within the interior of the battery pack housing (case). In addition, the cooling air passage may be partially defined by the outermost peripheral surface of the battery cells, the interior surface of the battery pack housing, and/or the support(s). In this case, the supports may at least partially isolate or physically separate the cooling air passage(s) from the end faces (terminals) of the battery cells. Optionally, a temperature sensor may be disposed within the isolated space (e.g., the space containing the end faces or terminals of the battery cells that is isolated from the cooling air passage). The temperature sensor may output signals representing the battery temperature and such battery temperature signals may be communicated to the battery charger (e.g., to a CPU disposed within the battery charger) in order to control, adjust and/or terminate the recharging operation.

In these embodiments as well, the cooling air forced into the battery pack can effectively cool the battery cells, because the cooling air may directly contact the outermost peripheral surface of the battery cells. Further, because the end faces or terminals of the battery cells are isolated from the cooling air, the electrical contact areas of the battery cells are protected from outside moisture and foreign substances. Moreover, the temperature sensor also may be isolated from the cooling air. Therefore, the temperature sensor will measure the temperature of the battery cells more accurately than if the cooling air directly contacts the temperature sensor. Furthermore, if the battery cells are disposed such that the peripheral side surfaces of the battery cells closely contact each other, heat can be readily conducted from higher-temperature battery cells to lower-temperature battery cells. As a result, the temperatures of the plurality of battery cells may be substantially unified, e.g., during a charging operation, thereby preventing degradation of the battery cells caused by overheating.

Optionally, the cooling air passage may preferably extend transversely to the longitudinal direction of the elongated battery cells. In this case, the design of the cooling air passage can be easily modified according to changes in the number of battery cells that will be disposed within the battery pack. As a result, the temperatures of the respective battery cells can be uniformly maintained without requiring significant battery pack design changes. On the other hand, if the cooling air passage extends in parallel with the longitudinal direction of the elongated battery cells, it may be difficult to properly adjust the air volume distribution in branched cooling air passages.

In another embodiment of the present teachings, an insulating material may be disposed on the peripheral side surfaces of the battery cells that are closest to the cooling air intake port (i.e., upstream battery cells). Generally speaking, the cooling air forced into the battery pack will be the lowest temperature (coolest) at the cooling intake port and the highest temperature (hottest) at the cooling air exhaust port, because the cooling air will absorb heat from the battery cells as the cooling air passes through the cooling air passage. Therefore, the battery cells disposed nearest to the cooling air intake port along the cooling air passage (i.e., the upstream portion of the cooling air passage) will be cooled by relatively cooler air, whereas the battery cells disposed farthest from the cooling air intake port along the cooling air passage (i.e., the downstream portion of the cooling air passage) will be cooled by relatively warmer air. Consequently, the upstream battery cells may be cooled more effectively than the downstream battery cells. In the absence of modifications to overcome this phenomenon, the respective battery cells may not be cooled to a uniform temperature and thus, some downstream battery cells may be subject to degradation caused by overheating.

In European Patent Publication No. 0 940 864, a metal heat sink contacts the battery cells that are expected to be the most difficult to cool (i.e., the downstream battery cells). However, a metal heat sink increases the overall weight of the battery pack as well as manufacturing costs. On the other hand, many insulating materials, such as plastic materials are both lightweight and inexpensive.

Thus, in another embodiment capable of uniformly cooling the battery cells within the battery pack, a relatively lightweight and low-cost insulting material may be disposed on or proximal to the upstream battery cells. In this case, the upstream battery cells will be cooled less efficiently than if no insulating material is provided. That is, if insulating material is disposed on (or proximal to) one or more of the upstream battery cells, the cooling air will absorb less heat and thus, the cooling air that contacts the downstream battery cells will be cooler or lower temperature than if no insulating material is provided. By contacting (cooling) the downstream battery cells with lower temperature cooling air, the downstream battery cells can be cooled more effectively. Thus, by utilizing the present teachings, all the battery cells easily can be uniformly maintained at the same, or substantially the same, temperature during the recharging operation. Moreover, because relatively low cost (and lightweight) insulating materials may be utilized in order to maintain all the battery cells at a uniform temperature, instead of a relatively high cost (and heavy) metallic heat sink, battery packs according to the present teachings can be manufactured at a lower cost (and lesser weight) than known battery pack designs.

Thus, rather than disposing a relatively heavy, metal heat sink material on the batteries that are least efficiently cooled (i.e., the downstream batteries), a lightweight, heat insulating material is preferably disposed on the battery cells that typically are most efficiently cooled (i.e., the upstream batteries). However, a combination of insulating material and heat sink material optionally may be utilized within the present battery packs. For example, insulating material may be disposed on the upstream batteries and heat sink material (e.g., metal heat sink material) may be disposed on the downstream batteries. In this case, the upstream and downstream batteries can be uniformly cooled and the total amount of heat sink material can be reduced as compared to known designs.

In these embodiments, the battery cells that are closest to the cooling air intake port along the cooling air passage, which battery cells may be more readily cooled by the cooling air, are not overcooled because these battery cells are partially or entirely covered with insulating material, such as heat insulating sheets. Herein, the term "insulating material" is intended to encompass any material(s) that possess(es) the property of reducing the ability of the cooling air to remove heat from the side surfaces of battery cells. Representative insulating materials include, e.g., resin sheets and resin covers, because these insulating materials are relatively durable and inexpensive. However, other insulating materials, including paper, also may be effectively utilized with the present teachings.

In one representative embodiment, the insulating material may be a substantially rigid resin cover that defines an air gap or clearance between the resin cover and the peripheral side surfaces of the battery cells. In this representative embodiment, air trapped within the air gap between the resin cover and the battery cells may also serve as an insulating material. Thus, such a design may further reduce the weight and cost of the battery pack without reducing the cooling efficiency of the design by effectively utilizing an air layer or air pocket as an insulating material.

In another embodiment of the present teachings, one or more cooling air directors may be disposed along the cooling air path in order to direct cooling air toward the side surface(s) of one or more of the battery cells. As noted above, the battery cells nearest to the cooling air exhaust port (i.e., the downstream batteries) along the cooling air passage are generally cooled less efficiently than the upstream battery cells, because the cooling air is heated by the upstream batteries before reaching the downstream batteries. In order to increase the cooling efficiency of the relatively warmer cooling air, the cooling air passage may include, e.g., one or more cooling air directors that specifically direct the cooling air towards the battery cell(s) that is (are) generally the least efficiently cooled by the cooling air. By causing a portion of the cooling air to directly impact the side surface of such difficult-to-cool battery cell(s), the cooling air passage and the cooling air can more effectively cool all the battery cells in a uniform manner. Various techniques for designing such air directors are taught below in more detail.

In another embodiment of the present teachings, the cross-sectional area of the cooling air passage may generally increase along the cooling air passage (e.g., from the cooling air intake port to the cooling air exhaust port). For example, the upstream portion of the cooling air passage (i.e., the portion of the cooling air passage nearest to the cooling air intake port) may have a relatively small cross-section and the upstream portion of the cooling air passage may contact a relatively small area of the peripheral side surfaces of the upstream battery cells. That is, the upstream portion of the cooling air passage may directly communicate with only a relatively small portion of the peripheral side surfaces of the battery cells. However, near the cooling air exhaust port, the downstream portion of the cooling air passage may have a relatively large cross section and may contact a relatively large area of the peripheral side surfaces of the downstream battery cells.

In this representative embodiment, the cooling air that is nearest to the cooling air exhaust port has already been heated by the upstream battery cells and thus has less capacity to cool the downstream battery cells. However, by increasing the respective areas of the downstream battery cells that are directly exposed to (communicate with) the cooling air passage, the downstream battery cells can be more effectively cooled by the warmer cooling air. For example, if the cross-sectional area of the cooling air passage increases towards the downstream portion of cooling air passage, the cooling air will move more slowly in the downstream portion of the cooling air passage than in the upstream portion of the cooling air passage. Consequently, the cooling air moving through the downstream portion of the cooling air passage will contact the downstream battery cells for a longer period of time (i.e., relative to the upstream battery cells). As a result, the cooling air can extract or absorb more heat from the downstream batteries, in spite of the fact that the temperature of the downstream cooling air is higher than the temperature of the upstream cooling air. Thus, even difficult-to-cool battery cells can be effectively cooled according to the present teachings, such that all battery cells within the battery pack will have a substantially uniform temperature regardless of the position of the battery cell along the cooling air passage.

In another embodiment of the present teachings, the side surfaces of the battery cells may be covered with a material, such as a paper material. For example, the side surfaces of the battery cells may be covered with waterproof sheets before disposing the battery cells in the battery pack housing (case). In this embodiment as well, the end faces or terminals of the battery cells may be isolated (physically separated) from the cooling air passage in order to protect the battery cell terminals and electrical contacts disposed there between from degradation, which was discussed further above. Further, the paper material disposed around the peripheral side surfaces of the battery cells, which side surfaces may define one wall of the cooling air passage, also may protect the battery cells from moisture and foreign substances that may be unintentionally introduced into the cooling air passage. Because the peripheral side surfaces of the battery cells are less likely to be damaged by moisture or foreign substances than the end faces or terminal contact areas, it is not necessary to strictly or completely isolate the peripheral side surfaces of the battery cells from the cooling air passage in this embodiment. Thus, in this embodiment, reliable and durable battery packs can be constructed without requiring the battery cells to be disposed within a dual-wall case.

In another embodiment of the present teachings, at least two cooling air passages may be defined within the battery pack. For example, the two cooling air passages may be, e.g., substantially symmetrical relative to a central plane that is defined between the end faces or terminals of the battery cells. If multiple battery cells are positioned side-by-side with the poles of adjacent battery cells disposed in opposite orientations, and the end faces (terminals) of these battery cells are electrically connected to each other, the multiple battery cells will be connected in series. Thus, by utilizing series-connected battery cells, the battery pack will be capable of generating a relatively high voltage output. By symmetrically positioning or defining two cooling air passages, the temperature distribution of the battery cells can be unified in order to prevent the temperature of any one particular battery cell from increasing sharply before the other battery cells.

These aspects, features and embodiments may be utilized singularly or in combination in order to make improved rechargeable battery packs, including but not limited to rechargeable battery packs for power tools and other battery-powered appliances. In addition, other objects, features and advantages of the present teachings will be readily understood after reading the following detailed description together with the accompanying drawings and the claims. Of course, the additional features and aspects disclosed herein also may be utilized singularly or in combination with the above-described aspects and features.

DETAILED DESCRIPTION OF THE INVENTION

Figure 1:
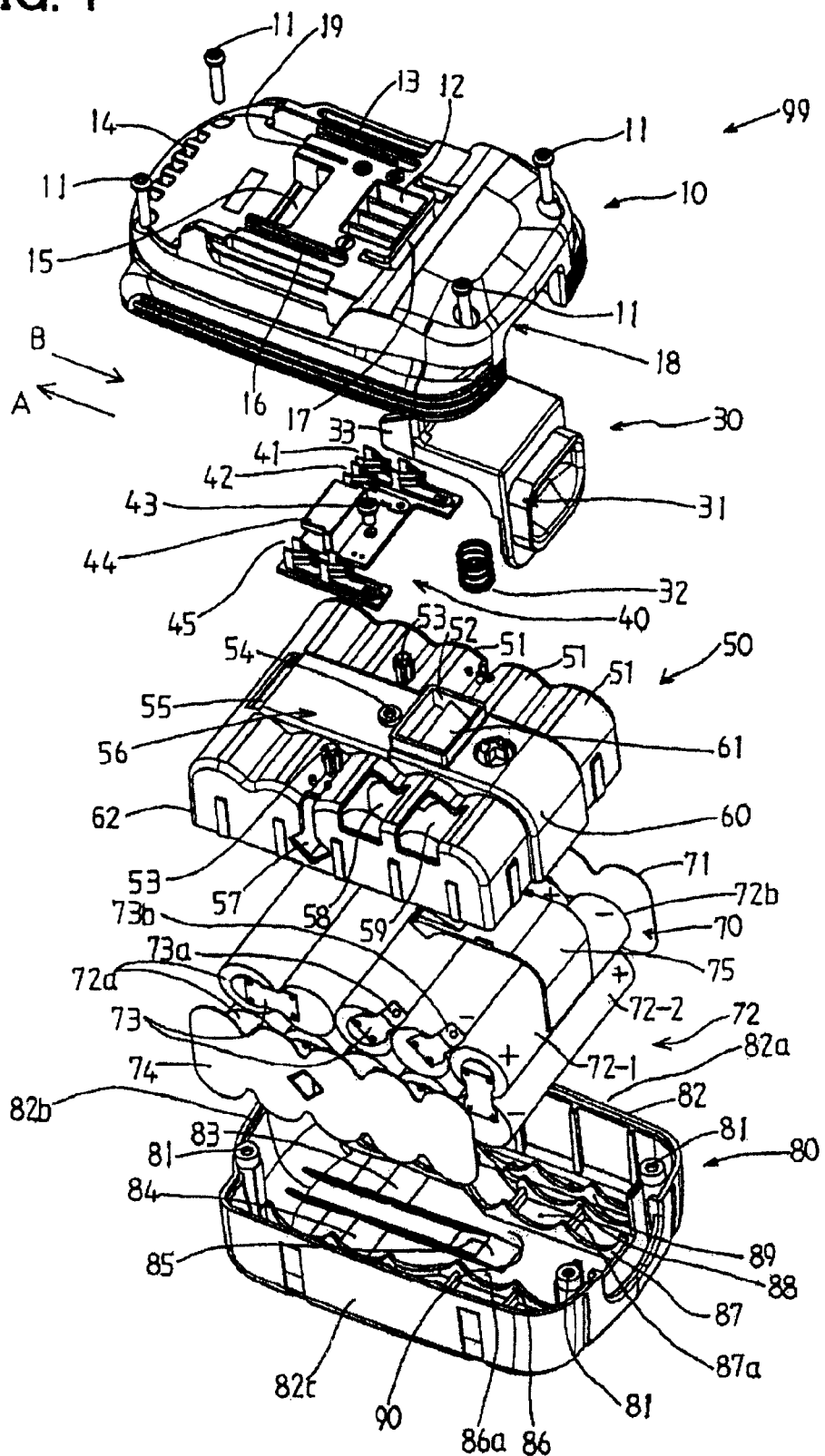
FIG. 1 shows an exploded perspective diagram of a representative battery pack according to the present teachings.
Figure 2:
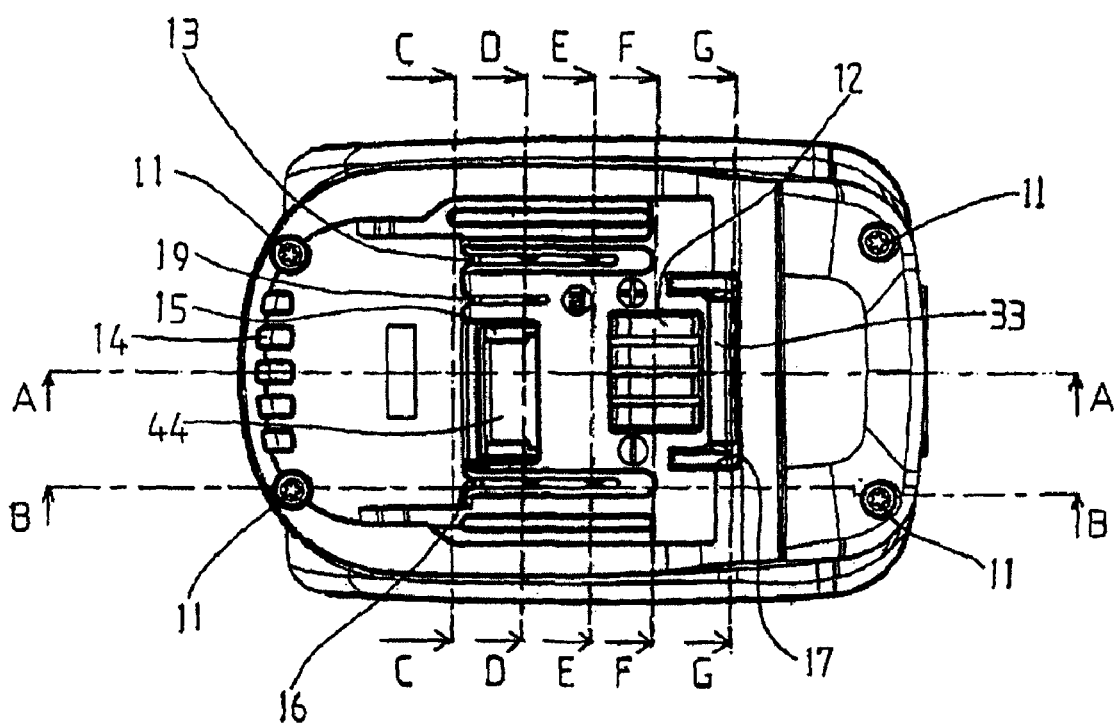
FIG. 2 shows a top view of the exterior of the battery pack shown in FIG. 1.
Figure 3:
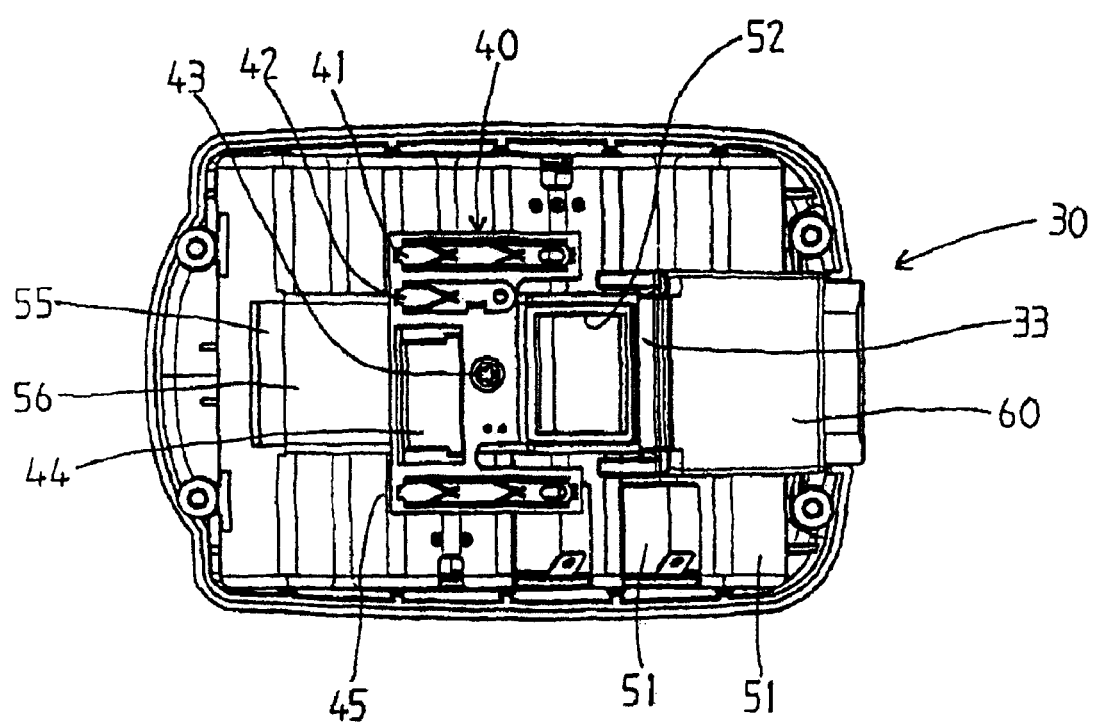
FIG. 3 shows a top view of the battery pack shown in FIG. 1, in which the outer lid has been removed.
Figure 4:
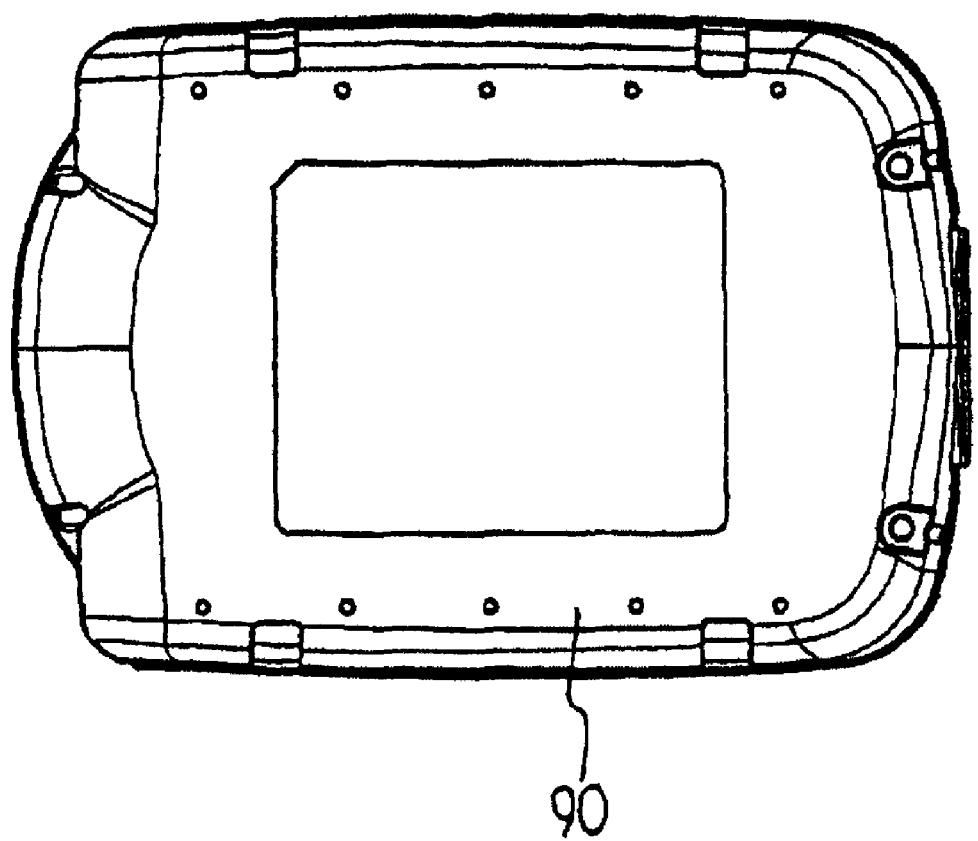
FIG. 4 shows a bottom view of the exterior of the battery pack shown in FIG. 1.
Figure 5:
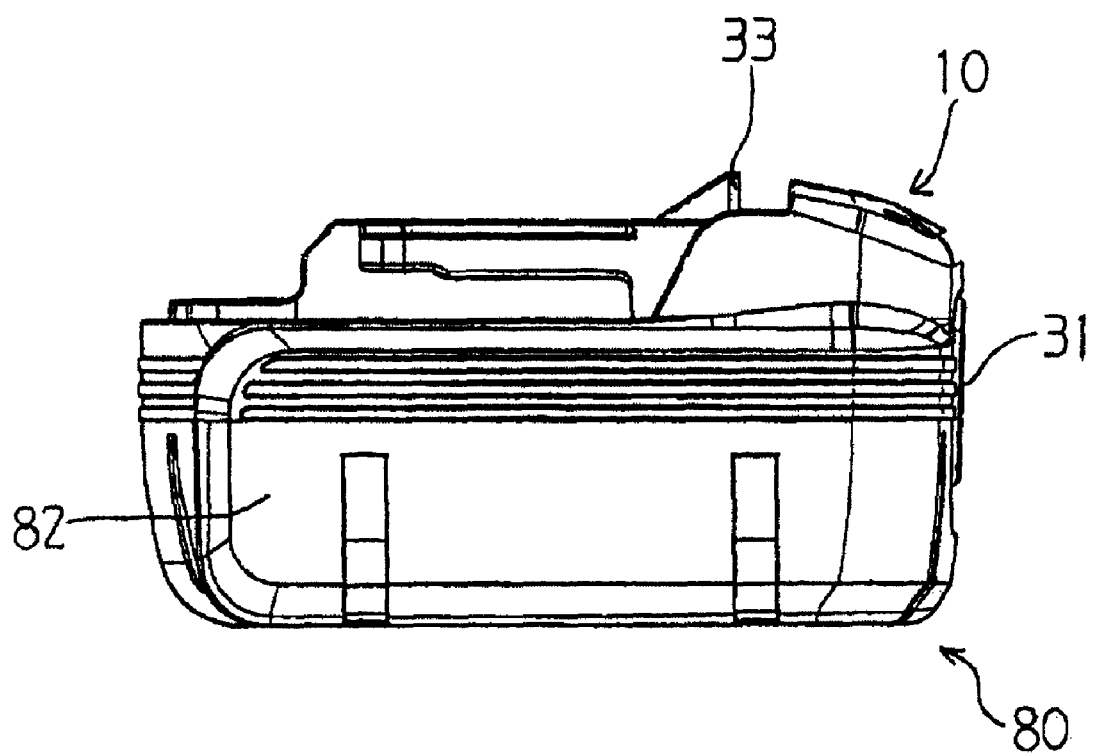
FIG. 5 shows a side view of the exterior of the battery pack shown in FIG. 1.
Figure 6:
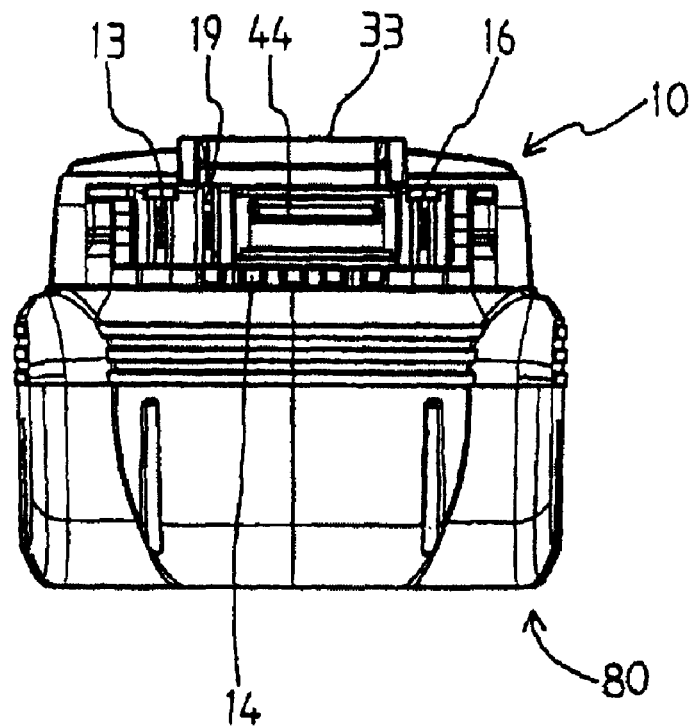
FIG. 6 shows a front view of the exterior of the battery pack shown in FIG. 1.
Figure 7:
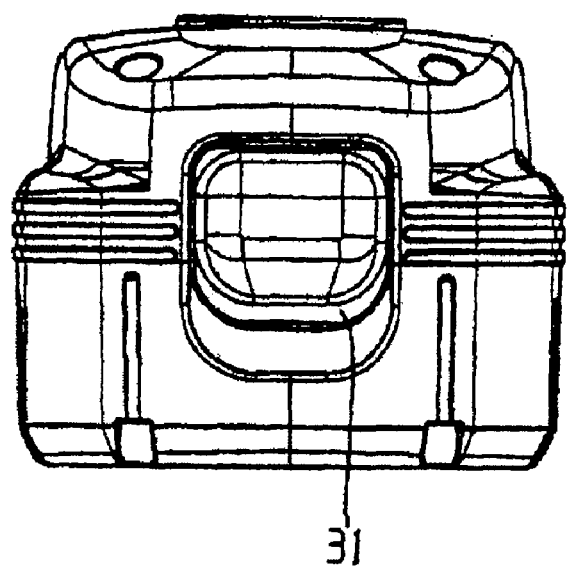
FIG. 7 shows a rear view of the exterior of the battery pack shown in FIG. 1.

In one aspect of the present teachings, battery packs may include one or more battery cells and each battery cell may have a first battery terminal and a second battery terminal. A housing may enclose the battery cell(s). A cooling air intake port and a cooling air exhaust port may be defined within the housing. At least one cooling air passage may extend between the cooling air intake port and the cooling air exhaust port. Optionally, the at least one cooling air passage is at least partially defined by at least one peripheral side surface of the battery cell(s) and an inner surface of the housing, so that cooling air can directly communicate with the at least one peripheral side surface of the battery cell(s).

Optionally, at least one isolated space is also defined within the housing and the at least one isolated space is shielded from the at least cooling air passage. Further, at least one first or second battery terminal is disposed within the at least one isolated space. In addition, the housing may also include at least one securing wall that further defines the at least one cooling air passage and separates the at least one cooling air passage from the at least one isolated space. Optionally, a temperature sensor, such as a thermistor, may be disposed within the at least one isolated space.

In another embodiment of the present teachings, a plurality of battery cells may be positioned side-by-side such that the respective first battery terminals are positioned within the same plane, and the terminals of the battery cells are electrically connected to each other. Further, the battery cells may have an elongated shape and the at least one cooling air passage may extend transversely to the longitudinal direction of the elongated battery cells.

Optionally, insulating material may be disposed at an upstream portion of the at least one cooling air passage. For example, the insulating material may comprise a relatively rigid resin cover disposed on the peripheral side surface of at least one battery cell. In addition, an air gap or air layer may be defined between the peripheral side surface of the at least one battery cell and the relatively rigid resin cover. In addition or in the alternative, heat sink material may be disposed at a downstream portion of the at least one cooling air passage. The heat sink material may be positioned to assist in cooling one or more downstream battery cells.

In another optional embodiment, at least one air direction changer may be disposed within the at least one cooling air passage. The at least one air direction changer preferably directs cooling air flowing through the at least one cooling air passage toward at least one peripheral side surfaces of one or more downstream battery cells.

In another optional embodiment, the area of the peripheral side surfaces of upstream battery cells that directly communicates with the at least one cooling air passage may be less than the area of the peripheral side surfaces of downstream battery cells that directly communicates with the at least one cooling air passage. For example, the cross-section of the cooling air passage may increase from the upstream side of the cooling air passage to the downstream side of the cooling air passage.

In another optional embodiment, waterproof material may be disposed on or may substantially surround at least one battery cell. In addition or in the alternative, moisture absorbing material may be disposed on or may substantially surround the at least one battery cell. For example, the moisture absorbing material may be disposed between at least one battery cell and the waterproof material.

In another optional embodiment, the at least one cooling air passage may include a first cooling air passage that is substantially symmetrically positioned relative to a second cooling air passage. Preferably, the plurality of battery cells is disposed between the first and second cooling air passages. In another preferred embodiment, the first cooling air passage may be shorter than the second cooling air passage. In addition or in the alternative, the cross-section of the first cooling air passage may be different (e.g., wider or narrower) than the cross-section of the second cooling air passage.

In another embodiment of the present teachings, the battery pack housing optionally may comprise separate top and bottom halves. A first securing wall or battery support may extend upwardly (i.e., substantially perpendicularly) from the bottom half of the battery pack housing and may be arranged and constructed to contact at least some of the battery cells disposed within the battery pack housing. A second securing wall or battery support may extend downwardly (i.e., substantially perpendicularly) from the top half of the battery pack housing and also may be arranged and constructed to contact at least some of the battery cells disposed within the battery pack housing. Optionally, an elastic material, or some other type of sealing material, may be interleaved between the battery cells and the first securing wall and/or the second securing wall. Naturally, a person of skill in the art can easily design a variety of structures for defining a cooling air passage and one or more isolated space(s) (i.e., spaces that do not communicate with the cooling air passage) within the battery pack and the person of skill in the art is not limited to using the above-described securing walls.

Optionally, two sets of first and second securing walls may be provided. In this case, the first set of first and second securing walls may together define a first wall that contacts the side surfaces of the battery cells and isolates (physically separates) a first set of end faces (terminals) of the battery cells from the cooling air passage. The second set of first and second securing walls may together define a second wall that contacts the side surfaces of the battery cells and isolates (physically separates) a second set of end faces (terminals) of the battery cells from the cooling air passage. Thus, the cooling air passage may be partially defined by the first and second walls. A cooling air intake port and a cooling air exhaust port may be defined at opposite ends of the cooling air passage.

Thus, in the assembled battery pack, the cooling air passage may be defined by the first and second walls (i.e., the two sets of first and second securing walls), the side surfaces of the battery cells positioned between the first and second walls and the interior surfaces of the top and bottom halves of the housing. A first isolated space may be defined by the first wall (i.e., one set of first and second securing walls), the interior surface of the housing, and the end faces or terminals of the battery cells. The first isolated space preferably does not directly communicate with the cooling air passage. Therefore, the end faces or terminals of the battery cells may be effectively isolated from directly contacting (or directly communicating with) the cooling air passage. As a result, the end faces or terminals of the battery cells can be protected or shielded from moisture and foreign substances. A second isolated space may be defined by the second wall (i.e., the other set of first and second securing walls), the interior surface of the housing, and the opposite end faces or terminals of the battery cells. The second isolated space also preferably does not directly communicate with the cooling air passage, thereby protecting or shielding the opposite end faces or terminals of the battery cells from degradation.

In another embodiment of the present teachings, the plurality of elongated battery cells may be disposed substantially in parallel and in a side-by-side relationship. For example, the side surfaces of the battery cells optionally may closely contact each other, so that heat will be reliably conducted or transferred between battery cells. Optionally, the respective end faces (terminals) of the battery cells may be positioned within substantially the same plane. Thus, the battery terminals can be easily connected and the amount of electrically conductive material that is necessary to electrically connect the respective battery cells can be minimized.

The first and second securing walls may include a plurality of indentations that respectively and substantially conform to the outer shape of the respective battery cells. For example, if the battery cells are cylinder-shaped, or substantially cylindrical, the indentations are preferably semi-circular. In this case, the securing walls will closely contact the side surfaces of the individual battery cells. Naturally, a plurality of semi-circular indentations may be spaced along the longitudinal direction of the first and second securing walls so as to correspond to the spacing of the respective battery cells. Thus, when the securing walls are assembled (fixedly disposed) around the battery cells, the securing walls will substantially isolate the cooling air passage from the respective end faces (terminals) of the battery cells.

In another embodiment of the present teachings, the battery cells may be divided into two blocks of battery cells, such as a top block and a bottom block. The space defined between the top and bottom blocks (stages) of battery cells is preferably isolated or shielded from the outer environment by the battery cells themselves. The first isolated space, which was discussed above, optionally may communicate with the second isolated space via the space or clearance between the top and bottom blocks of battery cells.

In another embodiment of the present teachings, the cooling air intake port and the cooling air exhaust port may be defined on a top surface of the battery pack housing. The top surface is defined when the battery pack is held in a substantially vertical orientation. Further, two cooling air passages may be defined within the battery pack. A first cooling air passage may be defined along the inner surface of the top portion (top half) of the battery pack housing and preferably extends from the cooling air intake port to the cooling air exhaust port. A second cooling air passage may be defined at least partially along an inner surface of the bottom portion (bottom half) of the battery pack housing. The second cooling air passage preferably extends from the cooling air intake port in a direction opposite of the first cooling air passage. Thus, the second cooling air passage may first extend downwardly from the cooling air intake port and along an inner surface of a first side surface of the battery pack housing. Thereafter, the second cooling air passage may extend along the inner surface of the bottom portion of the battery pack housing and finally turn to extend along a second side surface of the battery pack housing before reaching the cooling air exhaust port.

In another embodiment of the present teachings, the air-flow resistance of the first cooling air passage is preferably greater than the air-flow resistance of the second cooling air passage. Further, the air volume of the first cooling air passage is preferably less than the air volume of the second cooling air passage. That is, the first and second cooling air passages are preferably designed, such that a lesser amount of cooling air will be directed to the shorter first cooling air passage and a greater amount of cooling air will be directed to the longer second cooling air passage. Thus, a greater volume of cooling air preferably passes through the second cooling air passage, because the second cooling air passage directly contacts (communicates with) a greater number of battery cells disposed within the battery pack.

In another embodiment of the present teachings, a gap (distance) may be defined between the two sets of securing walls and the gap may partially define the first and second cooling air passages. Optionally, the gap (distance) between the two sets of securing walls is preferably narrower on the upstream side of the cooling air passage and is wider on the downstream side.

In another embodiment of the present teachings, at least one slope or ramp projects within the cooling air passage toward at least one difficult-to-cool battery cell. The slope or ramp may define an inclined surface on the cooling air passage. For example, the slope or ramp may narrow or reduce the distance between the inner surface of the battery pack housing and the side surface of one or more of the battery cells. Thus, the slope or ramp can selectively direct (guide) cooling air toward the side surface of one or more battery cells. This optional embodiment provides an additional technique for effectively cooling difficult-to-cool battery cells. For example, at least one slope or ramp may be advantageously disposed within the second cooling air passage. The incline of the slope or ramp may be straight or may be concave or convex. Thus, persons of skill in the art can readily adapt or modify this aspect of the present teachings to a particular battery pack design without departing from the scope of the present teachings.

Each of the additional features and method steps disclosed above and below may be utilized separately or in conjunction with other features and method steps to provide improved battery packs and methods for making and using the same. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, embodiments, features and steps described in this specification and in the dependent claims may be combined in ways that are not specifically enumerated in order to obtain other usual and novel embodiments of the present teachings and the present inventor expressly contemplates such additional combinations.

FIG. 1 shows an exploded perspective diagram of a representative battery pack 99 according to the present teachings. Battery pack 99 may include, e.g., an outer lid 10, a hook 30, a base 40, a top case (top half) 50, a set 70 of battery cells 72, and a bottom case (bottom half) 80. Four screws 11 optionally may join the top case 50 to the bottom case 80, although naturally other fasteners may be utilized for this purpose.

In this representative embodiment, a total of ten (10) battery cells (72-1 through 72-10) are disposed within the battery pack 99. Naturally, greater or less than ten battery cells may be utilized according to the present teachings with only minor modifications in order to change the voltage and current output properties of the battery pack. Each battery cell 72 may be elongated and the longitudinal axes of the respective battery cells 72 may be disposed in parallel, or substantially in parallel. One set of end faces (terminals) 72a of the battery cells 72 may be positioned substantially within the same (first) plane. A second set of end faces (terminals) 72b of the battery cells 72 may be positioned substantially within a same (second) plane. The second plane is preferably parallel, or substantially parallel, to the first plane.

In this representative embodiment, five battery cells 72 are respectively positioned in a side-by-side relationship in each of a top set and a bottom set (i.e., a top block of battery cells and a bottom block of battery cells). The peripheral side surfaces of battery cells 72 preferably closely contact each other so as to enable heat conduction (transfer) between battery cells 72. In the alternative, heat-conductive material may be disposed between the battery cells 72 so as to allow heat to be effectively conducted or transferred between battery cells 72. By enabling efficient heat conduction or transfer between battery cells 72, all battery cells 72 can be maintained at a uniform temperature (or a substantially uniform temperature) during charging and discharging operations. Therefore, it is further possible to prevent or substantially reduce the likelihood that one battery cell 72 will significantly overheat and become damaged.

For example, it is desirable to avoid the possibility that one battery cell 72 will reach a significantly higher temperature than the other battery cells 72, because the high temperature could permanently damage the overheated battery cell 72. High temperature (i.e., overheating) may cause internal damage to battery cell 72, which may be a nickel metal hydride cell, or may cause disconnection or separation of electrical contacts 73 between battery cells 72. Thus, by enabling efficient heat conduction or transfer between battery cells 72, the possibility of such an undesirable high temperature condition can be minimized or eliminated. Of course, a variety of techniques may be utilized, in addition to the present techniques or in the alternative to the present teachings, in order to ensure adequate heat conduction between battery cells 72. The present teachings are not particularly limited in this regard.

Figure 17:
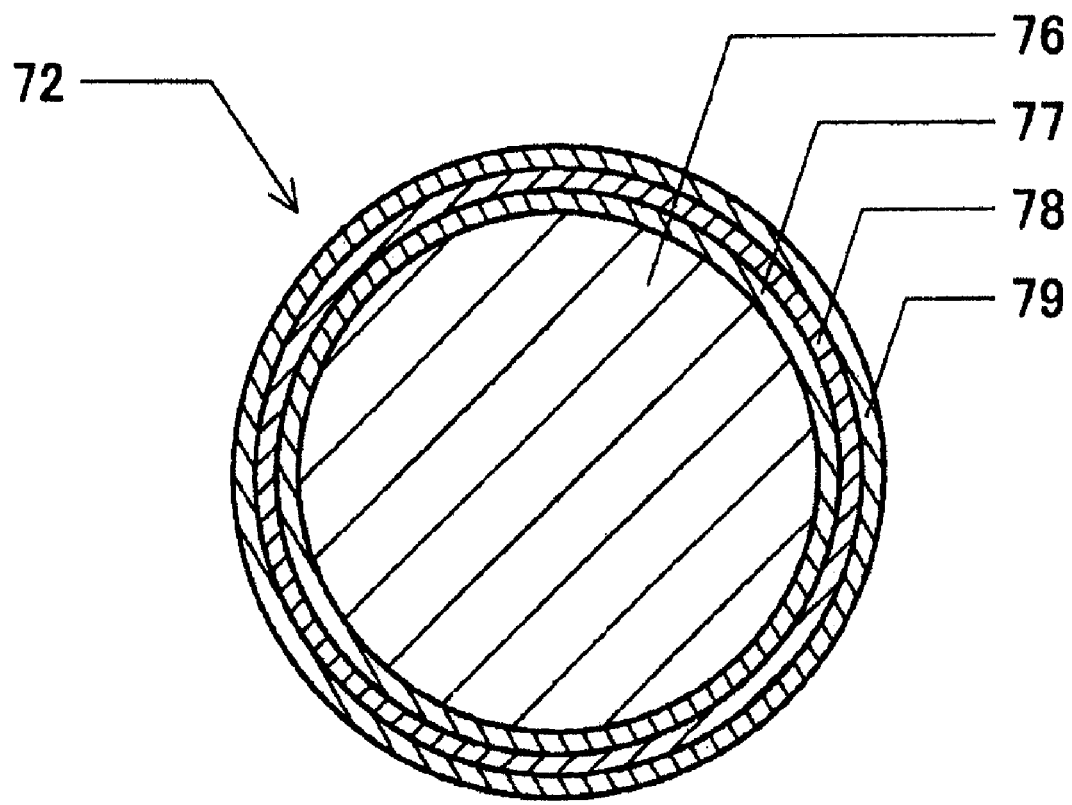
FIG. 17 show a cross section of a representative battery cell that may be disposed within the representative battery pack.

As shown in FIG. 17, each battery cell 72 optionally may comprise battery core 76 surrounded, or substantially surrounded, by one or more layers 77, 78, 79 of paper material(s). Outer layer 79 may preferably comprise waterproof paper material. Intermediate layer 78 may preferably be electrically insulating paper material. However, intermediate layer 78 is preferably capable of conducting heat. Further, inner layer 77 preferably may comprise moisture absorbing paper material. In this case, inner layer 77 can absorb any electrolyte that might leak from battery core 76. If inner layer 77 absorbs moisture (e.g., electrolyte) and outer layer 79 is waterproof, electrolyte can be prevented from seeping or leaking into the cooling air passage and thus to outside of the battery pack 99. In addition, layers 77, 78, 79 preferably electrically insulate battery core 76, but enable heat conduction from battery core 76.

Electrical contacts 73 may be metal plates (e.g., lead) or another type of electrodes. As noted above, electrical contacts 73 may be utilized to electrically connect the end faces (terminals) 72a and 72b of battery cells 72 in order to provide the appropriate battery output voltage and output current for the desired application of battery pack 99. Naturally, a variety of arrangements for electrical contacts 73 may be utilized depending upon the desired battery voltage and output current that will be supplied by battery pack 99. The present teachings are not particularly limited in this regard.

The battery cells 72 may be positioned such that their poles (i.e., positive and negative terminals) are oriented in opposite directions for adjacent battery cells 72. For example, if the left side of battery cell 72-1 is a positive terminal, the left side of the adjacent battery cell 72-2 is preferably a negative terminal. As noted above, the end faces 72a of adjacent battery cells 72 may be electrically connected to each other by electrical contacts 73 that comprise lead plates. Similarly, end faces 72b also may be electrically connected by a separate set of electrical contacts 73 that comprise lead plates. For example, all ten battery cells 72 may be series-connected using a set of lead plates 73. The respective lead plates 73 may be welded to the respective end faces 72a and 72b of battery cells 72, thereby providing both electrical connection and a durable physical connection or attachment between battery cells 72.

As noted above, the representative battery pack 99 contains five battery cells 72 that are positioned side-by-side in the horizontal direction and their side surfaces closely contact each other, thereby defining a first block (set) of battery cells 72. Another five battery cells 72 are positioned in the same manner in order to define a second block (set) of battery cells 72. The first and second blocks (sets) may be disposed (e.g., stacked) in two stages, e.g., one block of five battery cells on top of the other block. The peripheral side surfaces of battery cells 72 preferably closely contact each other in the vertical direction as well. If paper material is disposed around battery cells 72, then the peripheral side surfaces of the paper material for each battery cell 72 preferably contact each other closely (e.g., with little or no space or clearance there between).

A first insulation sheet 74 preferably covers the exterior of the lead plates 73, which lead plates 73 are respectively connected to appropriate end faces (terminals) 72a of battery cells 72. Similarly, a second insulation sheet 71 preferably covers the exterior of the lead plates 73 that are connected to the end faces (terminals) 72b.

The battery cells 72 may be disposed within bottom case (half) 80 and bottom case 80 may be defined as a box having bottom plate 90 and side plates 82, both of which are integrally formed from a resin. The top portion of bottom case 80 may be substantially open. Bottom case 80 also may include one or more screw hole(s) 81. Outer lid 10 may be secured to bottom case 80 using one or more screw(s) 11 that threadably engage the screw hole(s) 81.

First and second securing walls 86 and 87 may extend perpendicularly, or substantially perpendicularly, to the longitudinal (elongated) direction of the battery cells 72 and may project from the inner surface of bottom plate 90. A plurality of semi-circular (concave) recesses 86a and 87a may be defined within the upper surfaces of the first and second securing walls 86, 87. The semi-circular recesses 86a and 87a are preferably designed to closely receive and contact the peripheral side surfaces of battery cells 72. For example, five semi-circular recesses 86a and 87a may be disposed in series along each of the first and second securing walls 86 and 87. When the battery cells 72 are placed within bottom case 80, the bottom halves (i.e., downward facing surfaces) of the peripheral side surfaces of the five battery cells 72 on the bottom side of battery cells 72 fit into the semi-circular recesses 86a and 87a, thereby securing battery cells 72 within bottom case 80. In this state, the side surfaces of adjacent battery cells 72 tightly contact each other.

First and second securing walls 86 and 87 serve to position the side surfaces of the five battery cells 72 above the inner surface of bottom plate 90. Consequently, a space or gap is defined between the side surfaces of battery cells 72 on the inner surface of bottom plate 90. As will be further described below, second cooling air passage 92 may be defined by the space or clearance between the side surfaces of battery cells 72 and the inner surface of bottom plate 90, which is further defined by first and second securing walls 86 and 87. That is, second cooling air passage 92 may be surrounded and defined by first and second securing walls 86 and 87, the peripheral side surfaces of battery cells 72, and bottom case 80.

If semi-circular recesses 86a and 87a are defined on the upper surfaces of first and second securing walls 86 and 87, the upper surfaces of securing walls 86 and 87 will closely contact the side surfaces of battery cells 72 without any gaps or clearances there between. In this case, second cooling air passage 92, which is partially defined by first and second securing walls 86 and 87, will be isolated in an airtight manner (or substantially airtight manner) from the spaces defined on the opposite sides of first and second securing walls 86 and 87. Thus, first isolated space 93 may be defined between first securing wall 86 and side wall 82c of the bottom case 80 and second isolated space 95 may be defined between second securing wall 87 and side wall 82a of bottom case 80. As discussed further below, first isolated space 93 may communicate with second isolated space 93. Preferably, neither of first isolated space 93 or second isolated space 95 communicates with the cooling air passages 91, 92.

As shown in FIGS. 10-14, first securing wall 86 preferably contacts the peripheral side surfaces of battery cells 72 near the right-side end face (terminal) 72a, thereby isolating the right-side end face 72a of battery cells 72 from second cooling air passage 92. Similarly, second securing wall 87 preferably contacts the peripheral side surfaces of battery cells 72 near the left-side end face (terminal) 72b, thereby isolating the left-side end face 72b of battery cells 72 from second cooling air passage 92. Thus, first and second securing walls 86 and 87 may serve to isolate the end faces (terminals) 72a and 72b from directly communicating with the cooling air that passes (e.g., forcibly blown) through second cooling air passage 92. As a result, first and second securing walls 86 and 87 prevent, or at least significantly reduce, the possibility that the end faces 72a and 72b (or the electrical contacts 73 there between) will degrade due to contact with moisture or foreign substances introduced when cooling air is forcibly moved through second cooling air passage 92.

Thus, electrical contacts (lead plates) 73 and end faces (terminals) 72a and 72b of battery cells 72 are not electrically insulated and are disposed within the first and second isolated spaces that are defined on the outside-facing surfaces of first and second securing walls 86 and 87. Therefore, any moisture and foreign substances that may enter into the interior of battery pack 99 together with the cooling air will be prevented from reaching end faces (terminals) 72a and 72b of battery cells 72.

As will be further described below, the cooling air proceeds from right to left in FIG. 1 through second cooling air passage 92 that is defined between first and second securing walls 86 and 87. In FIG. 1, the right side is the upstream side of second cooling air passage 92. The distance between first and second securing walls 86 and 87 is preferably narrower on the upstream side and is wider on the downstream side.

Figure 12:
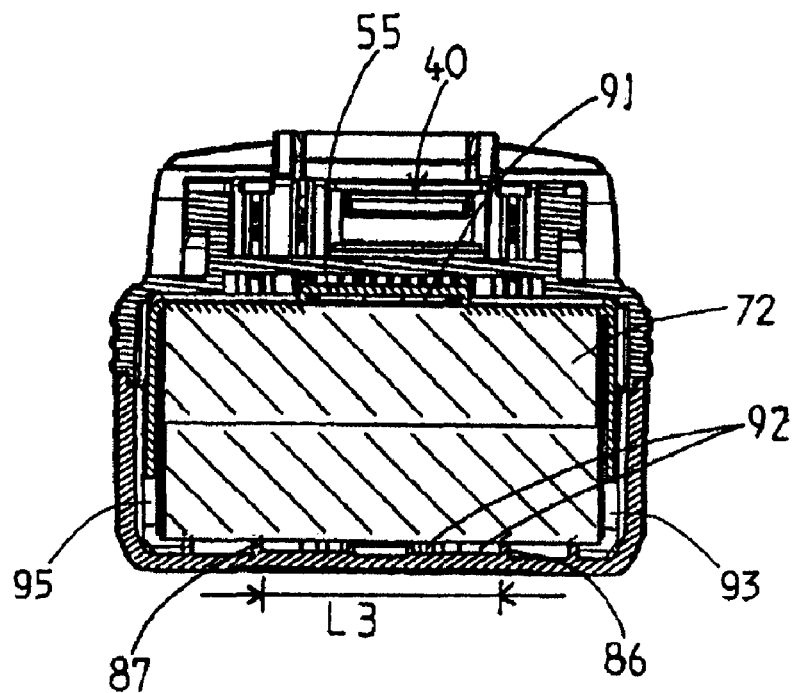
FIG. 12 shows an internal cross-sectional view of the representative battery pack taken along line E-E shown in FIG. 2.
Figure 13:
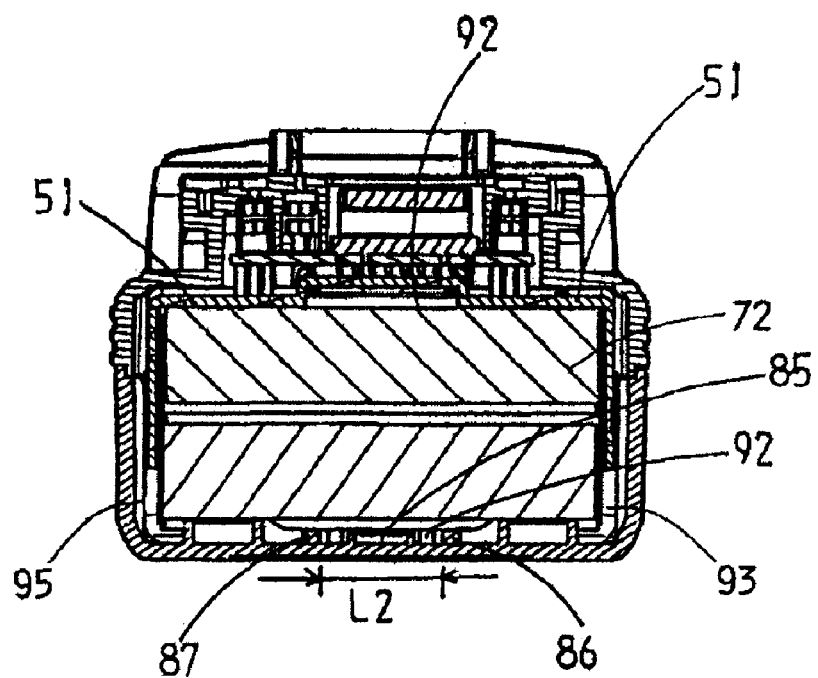
FIG. 13 shows an internal cross-sectional view of the representative battery pack taken along line F-F shown in FIG. 2.
Figure 14:
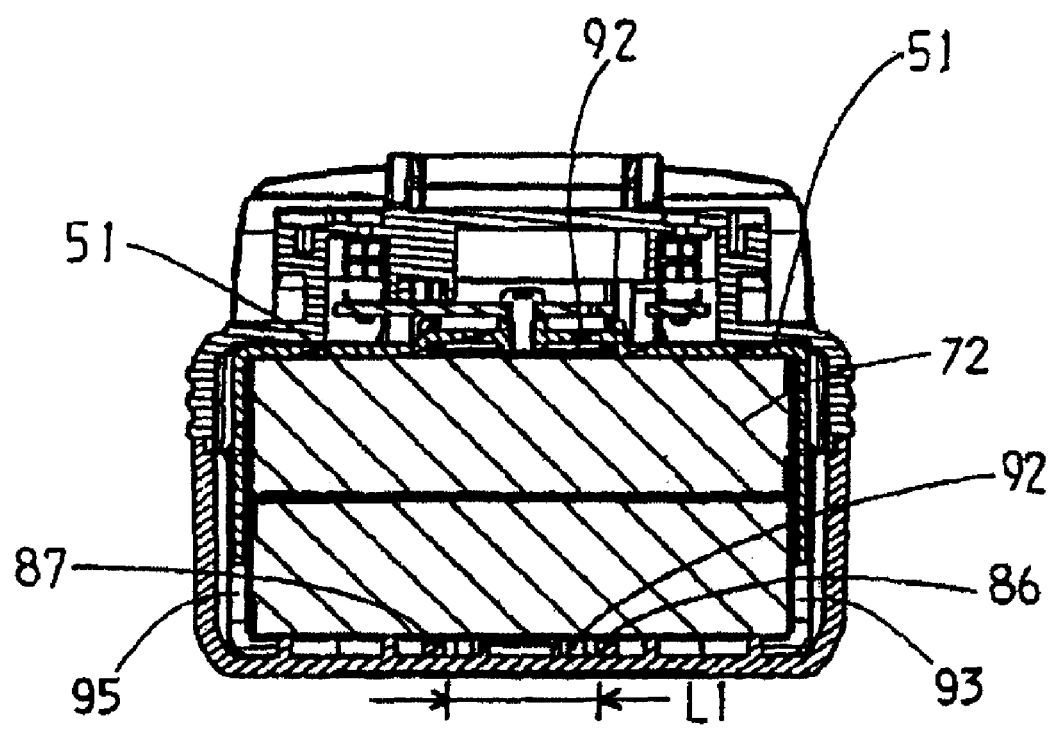
FIG. 14 shows an internal cross-sectional view of the representative battery pack taken along line G-G shown in FIG. 2.

For example, FIG. 14 shows a cross section of the upstream side of second cooling air passage 92. As shown in FIG. 14, distance L1 is defined between first and second securing walls 86 and 87 and distance L1 is relatively narrow. FIG. 13 shows a cross section of second cooling air passage 92 further downstream and the width of second cooling air passage 92 has expanded to distance L2. FIG. 12 shows a cross section of second cooling air passage 92 even further downstream and the width of second cooling air passage 92 has expanded to distance L3. Thus, the area of the side surfaces of battery cells 72 that directly contacts or communicates with second cooling air passage 92 is smaller or less for battery cells 72 on the upstream side of second cooling air passage 92. Consequently, the area of the side surface of battery cells 72 that directly contacts or communicates with second cooling air passage 92 is greater or larger for battery cells 72 on the downstream side of second cooling air passage 92.

As the cooling air approaches the downstream side of second cooling air passage 92, the temperature of the cooling air will increase, because the cooling air will have absorbed heat from the upstream battery cells 72. Thus, the downstream battery cells will be more difficult to cool, because the temperature of the cooling air is higher or hotter. However, if a larger area of these difficult-to-cool (downstream) battery cells 72 is exposed to (e.g., directly contacts or communicates with) second cooling air passage 92, all of battery cells 72 may be uniformly cooled. Thus, by expanding the cross-section of second cooling air passage 92 from the upstream side to the downstream side, the temperatures of the battery cells 72 on the upstream side and the battery cells 72 on the downstream side may be substantially uniform, even though the cooling air that contacts the downstream battery cells 72 has become warmer.

Referring back to FIG. 1, one or more slopes (ramps) 83, 84, and 85 may be defined on the inner surface of bottom plate 90. Slopes 83, 84, and 85 may be inclined toward respective peripheral side surfaces of battery cells 72 toward the downstream side of the cooling air. Thus, slopes 83, 84 and 85 may be positioned or disposed within the downstream portion of second cooling air passage 92. In addition, two slopes 83 and 84 optionally may be provided for a single battery cell 72 at the furthest downstream position.

Figure 8:
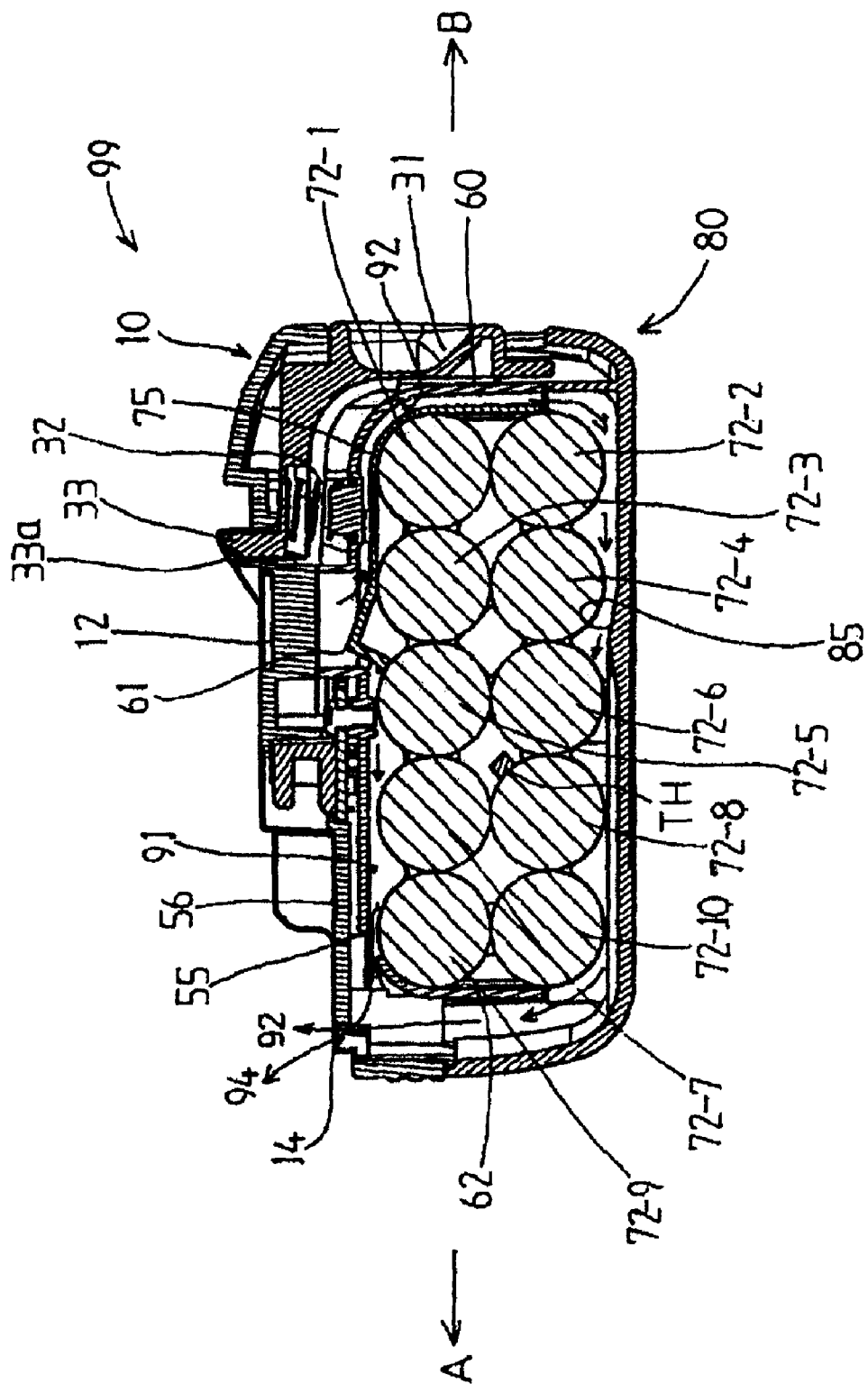
FIG. 8 shows an internal, cross-sectional view of the representative battery pack taken along line A-A shown in FIG. 2.
Figure 9:
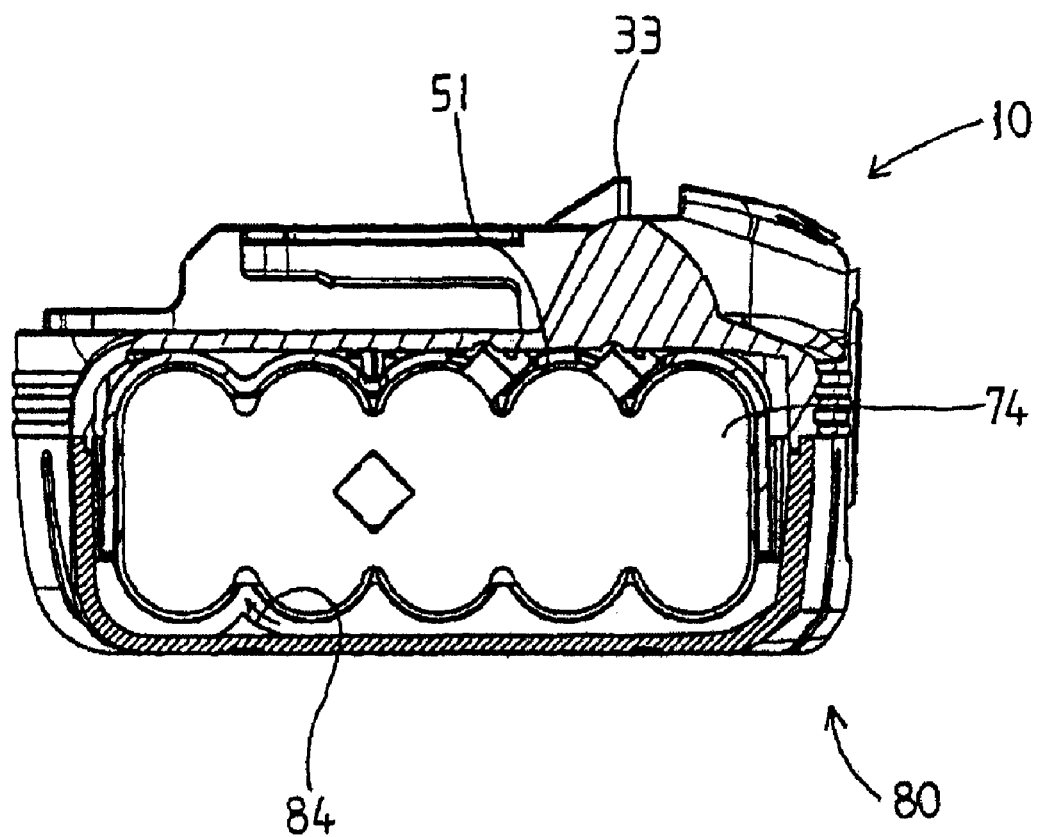
FIG. 9 shows an internal cross-sectional view of the representative battery pack taken along line B-B shown in FIG. 2.
Figure 10:
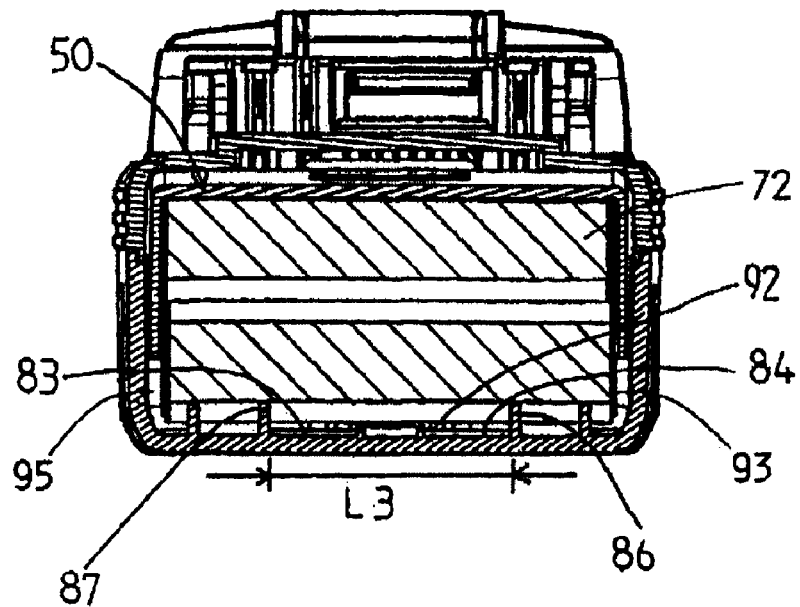
FIG. 10 shows an internal cross-sectional view of the representative battery pack taken along line C-C shown in FIG. 2.
Figure 11:
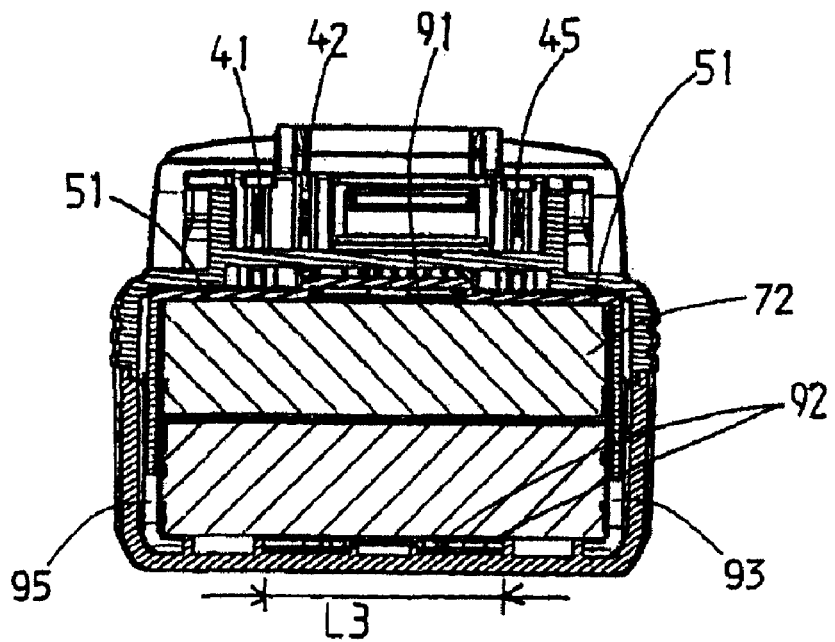
FIG. 11 shows an internal cross-sectional view of the representative battery pack taken along line D-D shown in FIG. 2.

As shown in FIG. 8, slope 85 may serve to change the direction of the cooling air flowing along the inner surface of bottom case 80. For example, slope 85 may cause a portion of the cooling air to directly contact or impact the side surface of battery cell 72-6 instead of flowing in parallel, or substantially in parallel, to the side surface of battery cell 72-6. As shown in FIG. 9, slope 84 also may serve to change the direction of the cooling air flowing along the inner surface of bottom case 80. Slope 83 may have an identical construction with slope 84 and may be disposed substantially in parallel with slope 84 along the second cooling air passage 92. Slopes 83 and 84 may respectively cause portions of the cooling air to directly contact or impact the side surfaces of battery cells 72-8 and 72-10. Slopes 83, 84 and 85 may also be interchangeably referred to as air direction changers 83, 84 and 85 or cooling air directors 83, 84, and 85.

Thus, slopes 83, 84, and 85 may be utilized to change the direction of a portion of the cooling air flowing along second cooling air passage 92. For example, slopes 83, 84 and 85 may be utilized to direct a portion of the cooling air directly toward one or more side surfaces of battery cells 72. By directly impacting the cooling air against a particular battery cell, it is possible to more effectively cool that particular battery cell. Thus, if one or more battery cells within battery pack 99 is particularly difficult to effectively cool, one or more slopes (air direction changers or cooling air directors) may be defined along the cooling air passage in order to direct more cooling air against the surface of the difficult-to-cool battery cell. In this case, it is possible to more effectively cool such difficult-to-cool battery cells and ensure that all battery cells 72 within battery pack 99 will be maintained at substantially the same temperature during a charging operation.

As shown in FIG. 1, walls 88 and 89 also may be optionally utilized as auxiliary walls for supporting the side surfaces of battery cells 72. Although not shown by FIG. 1, a second set of walls 88 and 89 may be defined on the opposite-end side, which is hidden from view by side wall 82 of the bottom case 80.

Further, a plurality of top surfaces 51 may be defined on the upper portion of top case (top half) 50. Each top surface 51 preferably has a semi-circular interior surface that is arranged and constructed to closely receive and contact the top half of the side surface of the five battery cells 72. When outer lid 10 is secured to bottom case 80, top case 50 will closely contact bottom case 80. Further, the top halves of the side surfaces of the five battery cells 72 on the top side of battery cells 72 will contact the semi-circular surfaces on the inside of semi-circular shaped top surfaces 51. In this state, the side surfaces of battery cells 72 that are adjacent to each other in the horizontal direction will firmly contact each other. Naturally, the side surfaces of battery cells 72 that are adjacent to each other in the vertical direction also will firmly contact each other.

Walls 56 and 60 may be defined substantially in the center of top case 50 and may each have a duct shape. A cooling air intake port 52 may be defined approximately in the center of the top case 50 and a cooling air exhaust port 55 may be defined along the left edge of top case 50. Duct-shaped wall 56 may serve to permit cooling air intake port 52 to directly communicate with cooling air exhaust port 55, thereby defining first cooling air passage 91 on the back side of duct-shaped wall 56. As discussed above, second cooling air passage 92 may be defined on the back-side of duct-shaped wall 60 and may guide or direct cooling air introduced from cooling air intake port 52 to the right side of FIG. 1. A branching plate 61 may be utilized to split or separate the cooling air into first cooling air passage 91 and second cooling air passage 92 and branching plate 61 may be disposed within cooling air intake port 52.

As shown in FIG. 8, first cooling air passage 91 primarily serves to cool battery cells 72-5, 72-7, and 72-9. If only three battery cells are cooled by the portion of the cooling air that is directed through first cooling air passage 91, all three battery cells can be effectively cooled, including battery cell 72-9 located furthest downstream. Therefore, the volume of cooling air flowing through first cooling air passage 91 may be less than the volume of cooling air flowing through second cooling air passage 92. For example, the air-flow resistance of first cooling air passage 91 may be higher or greater than the air-flow resistance of second cooling air passage 92.

Still referring to FIG. 8, second cooling air passage 92 may be defined along the back side of duct-shaped wall 60 and may first contact (communicate with) the right side of battery cells 72. Second cooling air passage 92 then extends to the space between first and second securing walls 86 and 87. The cooling air flowing through second cooling air passage 92 cools battery cells 72-3, 72-1, 72-2, 72-4, 72-6, 72-8, and 72-10 in that sequence. As the cooling air proceeds downstream, the cooling air will become increasingly heated (higher temperature), as was discussed above. Thus, the downstream cooling air will be less effective for cooling the battery cells than the upstream cooling air.

In known designs, the battery cell that is located furthest downstream (e.g., battery cell 72-10 in this embodiment) is typically not adequately cooled, because this downstream battery will be contacted and cooled by the warmest cooling air. However, in this representative embodiment, the cooling air will bend around battery cell 72-10, thereby contacting and cooling a relatively larger area of battery cell 72-10. Consequently, in this representative embodiment, battery cell 72-8 is more prone to experience large temperature increases due to inefficient cooling than battery cell 72-10.

As discussed above, several techniques may be utilized in order to more effectively cool such a difficult-to-cool battery cell. For example, a relatively larger area of the side surface of battery cell 72-8 may be exposed to the cooling air flowing through second cooling air passage 92, e.g., by defining one or more slopes 83 and 84 in the vicinity of battery cell 72-8. Thus, a greater portion of the cooling air will directly impact battery cell 72-8, thereby cooling battery cell 72-8 more effectively. In addition or in the alternative, the space defined between first and second securing walls 86 and 87 may be widened (i.e., thereby widening the cross-section of second cooling air passage 92) in order to expose more surface area of battery cell 72-8 to the cooling air. However, even in that case, battery cell 72-8 may still be difficult to cool. Thus, by forcing a relatively large volume of cooling air through second cooling air passage 92, battery cell 72-8 may be prevented from being subjected to excessive temperature increases.

According to this design, battery cells 72-3, 72-1, and 72-2, which are located on the upstream side of second cooling air passage 92, may be over-cooled, relatively speaking, because the upstream cooling air will be cooler (lower temperature) than the downstream cooling air. In particular, battery cell 72-1 may be cooled very effectively, because battery cell 72-1 is located at a corner and both the top and side surfaces of battery cell 72-1 face (directly contact or communicate with) second cooling air passage 92.

Therefore, in this embodiment, in order to prevent battery cells 72-3, 72-1, and 72-2 from being overcooled, an insulating material 75 optionally may be disposed on the peripheral side surfaces of battery cells 72-3, 72-1 and 72-2 that face second cooling air passage 92. Thus, by making it more difficult to cool battery cells 72-3, 72-1 and 72-2 (i.e., by shielding battery cells 72-3, 72-1 and 72-2 with insulating material 75), the temperature of the cooling air within second cooling air passage 92 will increase less when the cooling air passes through the upstream portion of second cooling air passage 92. Therefore, the cooling air contacting the downstream battery cells (e.g., battery cells 72-8 and 72-10) will be cooler (lower temperature) than an embodiment in which no insulating material is utilized. Consequently, all the battery cells 72 may be substantially uniformly cooled so as to maintain substantially the same temperatures.

Thus, a single second cooling air passage 92 may extend along a plurality of battery cells 72 to thereby sequentially cool the battery cells 72. In this case, it is possible to uniformly maintain the temperature of the plurality of battery cells 72 by covering the battery cells on the upstream side (e.g., one or more of battery cells 72-3, 72-1 and 72-2) with insulating material 75, thereby making the upstream battery cells more difficult to cool. By utilizing one or more air-direction changers 83 and 84, and by increasing amount of the surface area of the downstream battery cells (e.g., one or both of battery cells 72-8 and 72-10) that directly communicates with second cooling air passage 92, even the downstream battery cells may be effectively cooled.

Referring back to FIG. 1, a pair of bosses 53 may extend from the top surface of top case 50. Base 40 may be secured to bosses 83 using one or more screws 43. A positive terminal 41, a ground terminal 45, and a thermistor terminal 42 may be disposed on the top surface of base 40. Positive terminal 41 may be connected to the last positive electrode 73a of battery cells 72, which are connected in series in this embodiment, using an electrical contact (e.g., a lead plate (not shown)). This electrical contact may pass through opening 57, which is defined within top case 50. Ground terminal 45 may be connected to the last negative electrode 73b of battery cells 72 using an electrical contact (e.g., a lead plate (not shown)). This electrical contact may pass through opening 59 defined within top case 50.

Thermistor terminal 42 may be connected to thermistor TH. As shown in FIG. 8, thermistor TH may be disposed within the gap or space between the first and second blocks of battery cells 72. The electrical contact (e.g., a lead plate that electrically couples thermistor terminal 42 to thermistor TH) may pass through opening 58 defined within top case 50. As long as the temperature of the plurality of battery cells 72 is at or below a predetermined temperature, the positive voltage of battery cells 72 will be supplied to thermistor terminal 42. However, when the battery temperature reaches or exceeds the predetermined temperature, thermistor TH will disconnect and the voltage at thermistor terminal 42 will float. By monitoring voltage changes at thermistor terminal 42, it is possible to determine whether or not the temperature of battery cells 72 is at or below the predetermined temperature, i.e., whether or not the battery temperature has increased above the predetermined temperature. Thus, thermistor TH may be utilized to determine whether a maximum allowable battery temperature has been reached. If the battery temperature becomes excessive, charging of the battery cells may be discontinued until the battery temperature sufficiently decreases, thereby preventing permanent damage to the battery cells.

Figure 15:
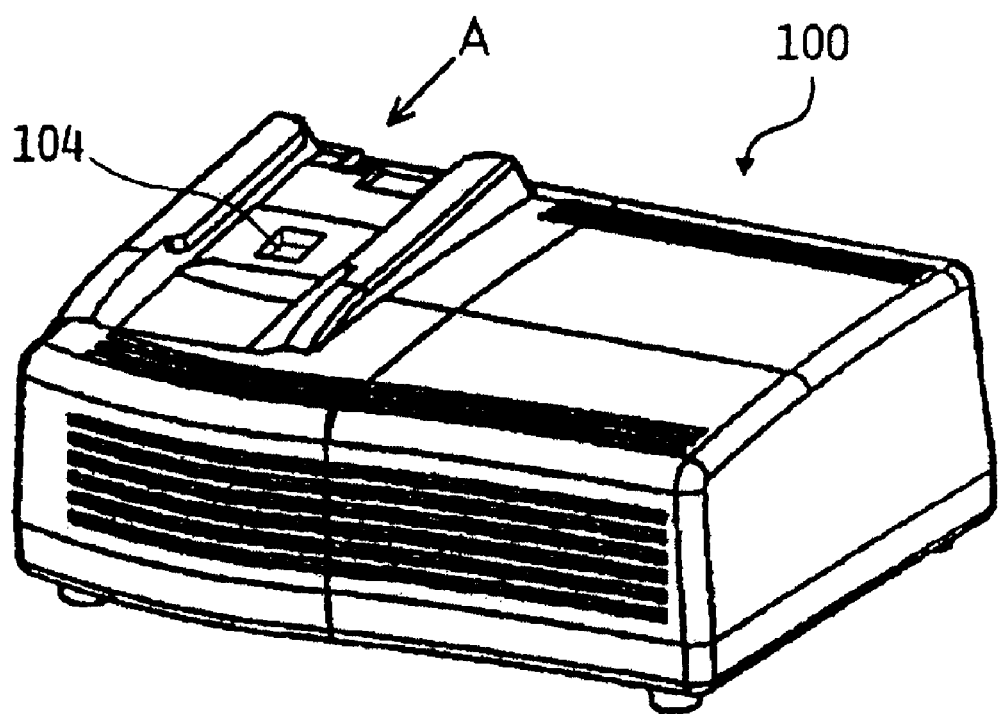
FIG. 15 shows a perspective view of a battery charger suitable for re-charging the representative battery pack.
Figure 16:
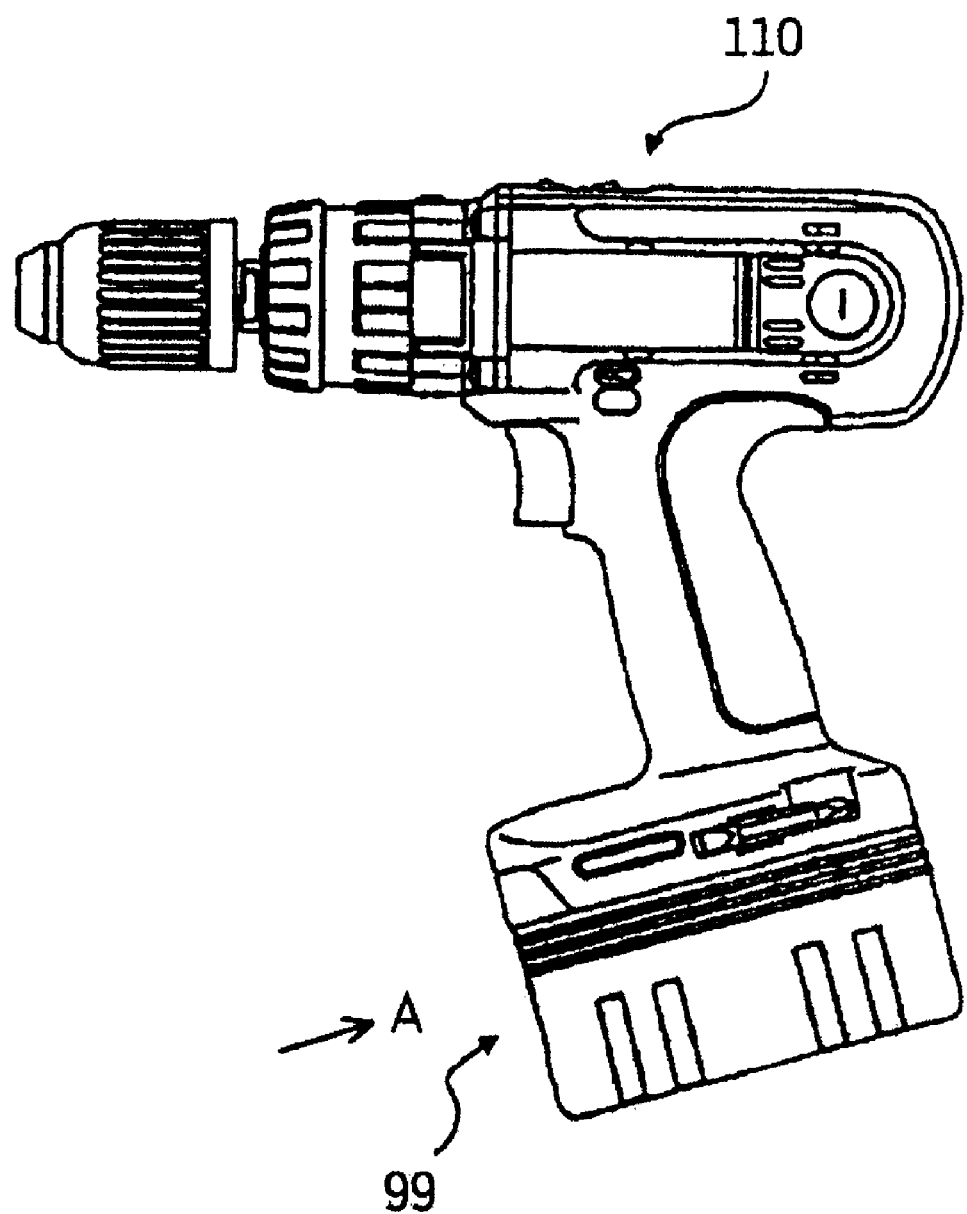
FIG. 16 shows a side view of the representative battery pack mounted on a representative battery-operated power tool.

As shown in FIG. 1, battery pack 99 may be connected, e.g., to battery charger 100 (shown in FIG. 15) or power tool 110 (shown in FIG. 16) by moving battery pack 99 in the direction of arrow A with respect to charger 100 or power tool 110. Thus, charger 100 and power tool 110 each preferably each include three terminals that extend in the direction of Arrow B shown in FIG. 1. In that case, when battery pack 99 is moved in the direction of Arrow A and is installed, the positive terminal of charger 100 or power tool 110 will be connected to positive terminal 41. Further, the grounding terminal of charger 100 or power tool 110 will be connected to grounding terminal 45 and a thermistor signal detection terminal will be connected to the thermistor terminal 42. When battery pack 99 is installed in charger 100 for recharging, a charging current will be supplied between positive terminal 41 and grounding terminal 45 in order to recharge battery cells 72. At the same time, charger 100 may monitor thermistor terminal 42 in order to monitor abnormal temperature increases within battery pack 99. When battery pack 99 is installed in power tool 110 in order to drive power tool 110, drive current is supplied to power tool 110 across positive terminal 41 and grounding terminal 45.

A signal terminal 44 also may be secured to base 40. Signal terminal 44 may include a terminal for receiving a constant voltage, a grounding terminal, a battery temperature terminal for communicating signals representative of the temperature of battery cells 72, and an ID terminal for outputting an identification signal unique to each battery pack 99. Thus, when battery pack 99 is installed in charger 100, signal terminal 44 will be connected to the signal terminal on the charger side, thereby enabling signals to be communicated between charger 100 and battery pack 99.

Thermistor TH is preferably connected to the battery temperature terminal. In this case, the voltage at the battery temperature terminal will change as the temperature of battery cells 72 changes. As noted above, thermistor TH may be disposed within the gap or space (e.g., an isolated space) between battery cells 72. A memory (e.g., an EEPROM) may be coupled to the ID terminal and the memory may store an identification number or signal that is unique for each battery pack 99. The memory (EEPROM) may be secured to the rear side of base 40. Various types of information, such as the specification, characteristics, and charging/discharging history of battery pack 99, may be stored in the EEPROM. By reading the information stored in the EEPROM, charger 100 can ensure selection of the proper charging mode (method) for battery pack 99.

As described above, thermistor TH is preferably disposed within the gap or space between battery cells 72 that is isolated from first and second cooling air passages 91 and 92. For example, thermistor TH may be disposed within a gap or space that is surrounded by battery cells 72 in all four directions. If the side surfaces of battery cells 72 closely contact each other, the gap or space between battery cells 72 will be isolated from first and second cooling air passages 91 and 92. Thus, lead plates 73, end faces (terminals) 72a and 72b of battery cells 72 and thermistor TH will be isolated from first and second cooling air passages 91 and 92. In particular, by isolating thermistor TH from cooling air passages 91 and 92, more accurate battery temperature readings can be obtained, because thermistor TH is disposed within a stagnate (isolated) air space that is surrounded and substantially enclosed by side portions of battery cells 72.

Hook 30 may be slidably disposed between top case 50 and outer lid 10 such that hook 30 can vertically slide (i.e., slide perpendicularly to the flat surface of the outer lid 10). Spring 32 may upwardly bias or urge hook 30. As shown in FIG. 8, upper tip 33 of hook 30 may protrude or project upwardly (i.e., perpendicularly) from outer lid 10. When battery pack 99 is connected to charger 100 or power tool 110 (e.g., by sliding battery pack 99 in the direction of arrow A), the securing wall provided in charger 100 or power tool 100 contacts the tapered surface 33a of upper tip 33 of the hook 30. As a result, hook 30 will be pushed down. When battery pack 99 slides in the direction of arrow A until battery pack 99 is completely connected to charger 100 or power tool 110, the securing wall provided in charger 100 or power tool 110 moves around to the right side of upper tip 33 of the hook. As a result, spring 32 will raise hook 30. In this state, battery pack 99 is prevented from moving in the direction of arrow B relative to charger 100 or power tool 110. In other words, battery pack 99 is prevented from disengaging from charger 100 or power tool 110. In order to remove battery pack 99 from charger 100 or power tool 110, the operator must manually push down protruding portion 31 of hook 30, thereby releasing the disengagement prevention mechanism.

As shown in FIG. 1, outer lid 10 is placed over the top side of top case 50. Cooling air intake port 12 may be defined within approximately the center of the top surface of outer lid 10, and may communicate with cooling air intake port 52 of top case 50. Preferably, charger 100 includes cooling air exhaust port 104 and cooling air is forcibly exhausted from charger 100, e.g. by a fan or blower. When battery pack 99 is connected to charger 100, cooling air intake port 12 of top lid 10 communicates with cooling air exhaust port 104 of charger 100. As a result, cooling air is forcibly blown from charger 100 into cooling air intake port 12 during the battery recharging operation.

Cooling air exhaust port 14 may be defined on the left edge of the top surface of top lid 10. As shown in FIG. 8, cooling air exhaust port 14 communicates with cooling air exhaust port 55 of top case 50 and the outer surface of wall 62, which is defined on the left side of top case 50. Because second cooling air passage 92 communicates with the outer surface of wall 62 on the left side of top case 50, cooling air (identified by numeral 94 in FIG. 8) that has passed through second cooling air passage 92 is also exhausted from exhaust opening 14.

Referring back to FIG. 1, outer lid 10 may include a variety of openings. Slot 13 may serve to guide the positive terminal of charger 100 or power tool 110 and lead it to positive terminal 41. Slot 16 may serve to guide the grounding terminal of charger 100 or power tool 110 and lead it to grounding terminal 45. Slot 19 may serve to guide the thermistor terminal of charger 100 or power tool 110 and lead it to thermistor terminal 42. Opening 15 enables the signal terminal of charger 100 or power tool 110 to be connected to signal terminal 44. Opening 17 enables upper tip 33 of hook 30 to protrude or project above upper lid 10.

In the representative assembled battery pack 99, first cooling air passage 91 and second cooling air passage 92 are symmetric (or substantially symmetric) relative to the central plane defined between the respective end faces (terminals) 72a and 72b of battery cells 72. When an equal number of battery cells 72 with positive poles (terminal) are disposed on the right and left sides of battery cells 72, temperature differences between battery cells 72 can be minimized by symmetrically providing cooling air passages 91 and 92.

The space inside the battery pack housing, which space is defined by top case 50 and bottom case 80, is basically divided into two types of spaces. The first type of space is the space between first and second securing walls 86 and 87, which space includes first and second cooling air passages 91 and 92. The second type of space includes the two isolated spaces 93 and 95 that are disposed external to first and second securing walls 86 and 87. First isolated space 93 is isolated and separated from first and second cooling air passages 91 and 92, because first securing wall 86 contacts the side surface near the left-bottom end face 72a of battery cells 72. Further, the inner surface of top case 50 contacts the side surface near the left-bottom end face 72a of battery cells 72. Similarly, second isolated space 95 is isolated and separated from first and second cooling air passages 91 and 92, because second securing wall 87 contacts the side surface near the right-top end face 72b of battery cells 72. Further, the inner surface of top case 50 contacts the side surface near the right-top end face 72b of battery cells 72.

First isolated space 93 may be connected to (communicated with) second isolated space 95 via the space or clearance (gap) between the battery cells, which space or clearance is also preferably isolated by battery cells 72 from first and second cooling air passages 91 and 92. End faces (terminals) 72a and 72b, lead plates 73, and the parts comprising the electrical circuits, such as thermistor TH, are preferably disposed within first and second isolated spaces 93 and 95. In that case, battery pack 99 will be highly resistant to moisture and foreign substances and will be durable, because the components that are most sensitive to degradation will be shielded from moisture and foreign substances that could be introduced into the interior of battery pack 99 by the cooling air. Further, by directly cooling the side surfaces of battery cells 72 (i.e., directly contacting the cooling air with the side surfaces of battery cells 72), overheating of battery cells 72 can be effectively prevented. Moreover, by utilizing one or more of the above described cooling capability enhancement techniques, temperature differences among the individual battery cells 72 can be successfully restricted to a relatively small temperature range.

Figure 18:
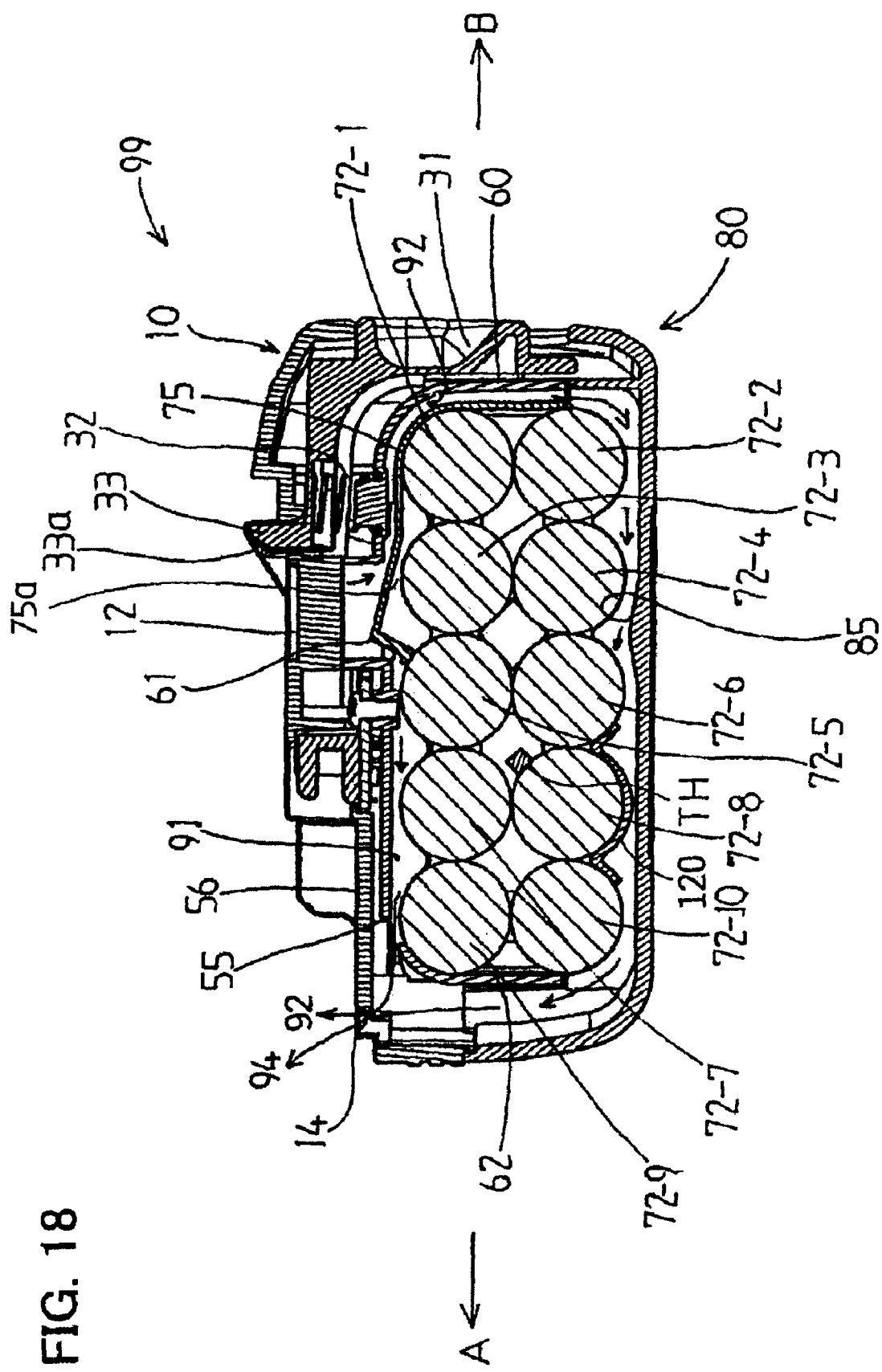
FIG. 18 shows an internal, cross-sectional view of a second representative battery pack according to the present teachings.

Battery pack 99 of a second representative embodiment is shown in FIG. 18. Because second representative battery pack 99 is substantially similar to first representative battery pack 99 and includes many common elements, only a description of elements that differ from the first representative battery pack 99 will be provided. The description concerning common aspects and elements of first representative battery pack 99 are thus incorporated by reference into the description of second representative battery pack 99.

Second representative battery pack 99 includes air gap or clearance 75a, which is defined between battery cells 72 and insulating material 75. In this embodiment, insulating material 75 may preferably be formed as a substantially rigid material that will reliably define air gap 75a. For example, insulating material 75 may be a polymer-based material, although a variety of materials may be utilized to form insulating material 75. Air gap 75a thus provides an insulating air layer between battery cells 72 and cooling air passages 91, 92, thereby reducing the ability of cooling air passages 91, 92 to cool, e.g., battery cell 72-3, which is disposed on the upstream side of cooling air passages 91, 92.

Further, heat sink material 120 may be disposed around or contact one or more of the difficult-to-cool battery cells 72 that are disposed on the downstream side of cooling air passages 91, 92. For example, heat sink material 120 may be disposed on one or more of battery cells 72-6, 72-8 and/or 72-10. Heat sink material 120 may comprise, e.g., a metal material and preferably serves to conduct or transfer heat away from battery cells 72 to cooling air passages 91, 92, thereby more efficiently cooling the difficult-to-cool battery cells 72.

By providing insulating material 75 and air gap 75a on the upstream side of cooling air passages 91, 92 and by providing heat sink material 120 on the downstream side of cooling air passages 91, 92, battery cells 72 may be uniformly cooled. Further, if insulating material 75 and air gap 75a are utilized on the upstream side, the amount of heat sink material 120 disposed on the downstream side can be minimized. However, a person of skill in the art will recognize that insulating material 75, air gap 75a and heat sink material 120 are optional elements and none, one, two or all these elements may be utilized in any combination according to the present teachings.

Battery packs 99 according to the first and second representative embodiments possess the same level of reliability as obtained by disposing the battery cells within a dual-wall case while at the same time achieving an overall weight reduction of 8 to 10%. The manufacturing cost can also be significantly reduced. Thus, battery pack 99 offer several advantages as compared to the known art.

As noted above, various modifications can be made to the present teachings without departing from the scope of the present teachings. In addition, various techniques may be combined with the present teachings in order to define additional useful embodiments of the present teachings. For example, relevant battery charging techniques and battery pack designs are also taught in commonly-assigned U.S. Pat. Nos. 5,909,101, 5,912,546, 6,066,938, 6,075,347, 6,124,698, 6,191,554, 6,191,560, 6,204,640, 6,204,641, 6,225,786, 6,229,280, 6,275,009, 6,278,261, 6,362,600, 6,373,228, 6,404,167, 6,433,515, 6,433,517, US Patent Publication Nos. 2001-17531, 2001-48289, 2002-79867 and U.S. patent application Ser. No. 09/417,698, which corresponds to European Patent Publication No. 0 994 523, all of which are hereby incorporated by reference in their entirety as if fully set forth herein and all of which may be advantageously combined with the present teachings.

What is claimed is:

1. A battery pack comprising:
   a plurality of battery cells,
   a housing substantially enclosing the plurality of battery cells,
   a cooling air intake port and a cooling air exhaust port defined in the housing,
   a first cooling air passage and a second cooling air passage, each of the cooling air passages extending between the cooling air intake port and the cooling air exhaust port along an inner surface of the housing, wherein the second cooling air passage extends from the cooling air intake port in a direction opposite of the first cooling air passage and the second cooling air passage is longer than the first cooling air passage, and
   a branching member disposed within the cooling air intake port, wherein the branching member separates cooling air introduced from the cooling air intake port into the first and second cooling air passages such that a greater amount of the cooling air is directed into the second cooling air passage than the first cooling air passage.

2. A battery pack as in claim 1, wherein
   the second cooling air passage is configured to cool a greater number of the battery cells than the first cooling air passage.

3. A battery pack as in claim 2, wherein the second cooling air passage communicates with a greater number of the battery cells than the first cooling air passage.

4. A battery pack as in claim 1, wherein
   the second cooling air passage communicates with a greater number of the battery cells than the first cooling air passage.

5. A battery pack as in claim 1, wherein
   the second cooling air passage is configured to cool a greater number of the battery cells than the first cooling air passage, and
   an air flow resistance of the second cooling air passage is lower than an air flow resistance of the first cooling air passage, whereby a greater amount of the cooling air flows through the second cooling air passage than the first cooling air passage.

6. A battery pack as in claim 5, wherein a cross-section of at least a part of the second cooling air passage increases between the cooling air intake port and the cooling air exhaust port, whereby the air flow resistance of the second cooling air passage is lower than the air flow resistance of the first cooling air passage.

7. A battery pack as in claim 5, wherein a cross-section of at least a part of the second cooling air passage is larger than a cross-section of the first cooling air passage, whereby the air flow resistance of the second cooling air passage is lower than the air flow resistance of the first cooling air passage.

8. A battery pack as in claim 5, wherein the second cooling air passage communicates with a greater number of the battery cells than the first cooling air passage.

9. A battery pack as in claim 1, wherein
   the second cooling air passage communicates with a greater number of the battery cells than the first cooling air passage, and
   an air flow resistance of the second cooling air passage is lower than an air flow resistance of the first cooling air passage, whereby a greater amount of the cooling air flows through the second cooling air passage than the first cooling air passage.

10. A battery pack as in claim 1, wherein each of the first and second cooling air passages is at least partially defined by at least one of peripheral side surfaces of the battery cells and the inner surface of the housing, and the cooling air directly communicates with the at least one of the peripheral side surfaces of the battery cells.

11. A battery pack as in claim 1, wherein the plurality of battery cells are disposed between the first and second cooling air passages.

12. A battery pack comprising:
a plurality of battery cells,
a housing substantially enclosing the plurality of battery cells,
a cooling air intake port and a cooling air exhaust port defined in the housing, and
a first cooling air passage and a second cooling air passage, each of the cooling air passages extending between the cooling air intake port and the cooling air exhaust port along an inner surface of the housing, wherein the second cooling air passage extends from the cooling air intake port in a direction opposite of the first cooling air passage, the second cooling air passage is longer than the first cooling air passage, the second cooling air passage cools a greater number of the battery cells than the first cooling air passage, and an air flow resistance of the second cooling air passage is lower than an air flow resistance of the first cooling air passage, whereby a greater amount of the cooling air flows through the second cooling air passage than the first cooling air passage.

13. A battery pack as in claim 12, wherein a cross-section of the second cooling air passage increases between the cooling air intake port and the cooling air exhaust port, whereby the air flow resistance of the second cooling air passage is lower than the air flow resistance of the first cooling air passage.

14. A battery pack as in claim 12, wherein
the cross-section of the second cooling air passage is at least partly larger than a cross-section of the first cooling air passage, whereby the air flow resistance of the second cooling air passage is lower than the air flow resistance of the first cooling air passage.

15. A battery pack as in claim 12, wherein the second cooling air passage communicates with a greater number of the battery cells than the first cooling air passage.

16. A battery pack comprising:
a plurality of battery cells,
a housing substantially enclosing the plurality of battery cells,
a cooling air intake port and a cooling air exhaust port defined in the housing, and
a first cooling air passage and a second cooling air passage, each of the cooling air passages extending between the cooling air intake port and the cooling air exhaust port along an inner surface of the housing, wherein the second cooling air passage extends from the cooling air intake port in a direction opposite of the first cooling air passage, the second cooling air passage is longer than the first cooling air passage, the second cooling air passages cools a greater number of the battery cells than the first cooling air passage and a greater amount of the cooling air flows through the second cooling air passage than the first cooling air passage.

17. A battery pack as in claim 16, wherein the second cooling air passage communicates with a greater number of the battery cells than the first cooling air passage.

* * * * *